(12) United States Patent
Takeshita et al.

(10) Patent No.: US 8,971,611 B2
(45) Date of Patent: Mar. 3, 2015

(54) IMAGE PROCESS DEVICE, IMAGE PROCESS METHOD, AND IMAGE PROCESS PROGRAM

(71) Applicant: JVC KENWOOD Corporation, Yokohama-shi (JP)

(72) Inventors: Hiroshi Takeshita, Hiratsuka (JP); Toshifumi Mori, Inagi (JP); Masaki Ishikawa, Yokohama (JP); Satoshi Ishizaka, Yokohama (JP); Hiroyuki Ryu, Yokohama (JP); Yuji Nishi, Yokohama (JP)

(73) Assignee: JVC KENWOOD Corporation, Yokohama-shi (JP)

( * ) Notice: Subject to any disclaimer, the term of this patent is extended or adjusted under 35 U.S.C. 154(b) by 129 days.

(21) Appl. No.: 13/760,825

(22) Filed: Feb. 6, 2013

(65) Prior Publication Data

US 2013/0202220 A1 Aug. 8, 2013

(30) Foreign Application Priority Data

Feb. 8, 2012 (JP) ................................ 2012-025127
Aug. 3, 2012 (JP) ................................ 2012-173209
Dec. 27, 2012 (JP) ................................ 2012-285780

(51) Int. Cl.
*G06K 9/00* (2006.01)
*G06K 9/40* (2006.01)
*G06K 9/48* (2006.01)
*G06T 5/00* (2006.01)
*H04N 13/02* (2006.01)

(52) U.S. Cl.
CPC .............. *G06T 5/001* (2013.01); *H04N 13/026* (2013.01)
USPC ............ 382/154; 382/260; 382/264; 382/199

(58) Field of Classification Search
None
See application file for complete search history.

(56) References Cited

U.S. PATENT DOCUMENTS

| 7,643,670 | B2* | 1/2010 | Leach et al. | 382/154 |
|---|---|---|---|---|
| 7,957,581 | B2* | 6/2011 | Wu | 382/154 |
| 8,326,023 | B2* | 12/2012 | Sawachi | 382/154 |
| 8,553,972 | B2* | 10/2013 | Kim et al. | 382/154 |
| 8,605,992 | B2* | 12/2013 | Kohli et al. | 382/154 |
| 8,731,279 | B2* | 5/2014 | Shin et al. | 382/154 |
| 2011/0026808 | A1* | 2/2011 | Kim et al. | 382/154 |
| 2012/0148173 | A1* | 6/2012 | Shin et al. | 382/300 |
| 2012/0257814 | A1* | 10/2012 | Kohli et al. | 382/154 |

FOREIGN PATENT DOCUMENTS

JP 2009-044722 2/2009
JP 2011-048586 3/2011

OTHER PUBLICATIONS

M. Köppel, M.B. Makhlouf, M. Müller, and P. Ndjiki-Nya, "Temporally consistent adaptive depth map preprocessing for view synthesis", ;in Proc. VCIP, 2013, pp. 1-6.*

* cited by examiner

*Primary Examiner* — Andrae S Allison
(74) *Attorney, Agent, or Firm* — Venable LLP; Michael A. Sartori; Todd R. Farnsworth

(57) ABSTRACT

A mask correcting unit corrects an externally set mask pattern. A depth map processing unit processes a depth map of an input image for each of a plurality of regions designated by a plurality of mask patterns corrected by the mask correcting unit. An image generation unit generates an image of a different viewpoint on the basis of the input image and depth maps processed by the depth map processing unit. The mask correcting unit performs a blurring process on an object boundary part of the mask pattern.

8 Claims, 42 Drawing Sheets

FIRST THRESHOLD VALUE

IMAGE PROCESS DEVICE, IMAGE PROCESS METHOD, AND IMAGE PROCESS PROGRAM

CROSS REFERENCE TO RELATED APPLICATION

This application is based upon and claims the benefit of priority from both the prior Japanese Patent Application No. 2012-025127, filed Feb. 8, 2012, the prior Japanese Patent Application No. 2012-173209, filed Aug. 3, 2012 and the prior Japanese Patent Application No. 2012-285780, filed Dec. 27, 2012, the contents of which are incorporated herein by references.

BACKGROUND

The present invention relates to an image process device, an image process method, and an image process program, for executing a process of converting a 2D image into a 3D image for stereoscopic vision.

In recent years, 3D video content items such as 3D movies or 3D broadcasting have been widespread. In order to allow an observer to perform stereoscopic vision, a right eye image and a left eye image with parallax are required. When a 3D video is displayed, a right eye image and a left eye image are displayed in a time-division manner, and the right eye image and the left eye image are separated using glasses for video separation such as shutter glasses or polarization glasses. Thereby, an observer can perform stereoscopic vision by observing the right eye image only with the right eye and the left eye image only with the left eye. In addition, if a right eye image and a left eye image are not temporally divided but spatially divided, glasses are not necessary but a resolution is reduced. In any of the glasses method and the glassless method, a right eye image and a left eye image are commonly necessary.

There are largely two methods of producing 3D images, that is, one is a method of simultaneously capturing a right eye image and a left eye image using two cameras, and the other is a method of generating a parallax image by editing a 2D image captured by a single camera afterward. The present invention relates to the latter and relates to a 2D-3D conversion technique.

FIG. 1 is a diagram illustrating a basic process procedure of 2D-3D conversion. First, a depth map (also referred to as depth information) is generated from a 2D input image (step S10). In addition, 3D images are generated using the 2D input image and the depth map (step S30). In FIG. 1, the 2D input image is set as a right eye image of the 3D output images, and an image obtained by shifting pixels of the 2D input image using the depth map is set as a left eye image of the 3D output images. Hereinafter, a set of a right eye image and a left eye image with predetermined parallax is referred to as 3D images or parallax images.

If 3D images are to be generated, pixels of a 2D image are shifted using a depth map, and a 2D image of a different viewpoint with parallax for the 2D image is generated. Omitted pixels occur in the generated 2D image of the different viewpoint due to the pixel shift. Generally, the omitted pixels are interpolated from peripheral pixels.

Patent Literature 1: Japanese Patent Application Laid-Open No. 2011-48586
Patent Literature 2: Japanese Patent Application Laid-Open No. 2009-44722

In a case where a step-difference in depths at an object boundary is large inside a screen, a pixel shift amount of the boundary part increases. Therefore, the number of omitted pixels, that is, the area of an omitted region also increases. As described above, the omitted pixels are interpolated from peripheral pixels; however, if the area of the omitted region increases, a location where an interpolated pixel does not match an interpolation position tends to occur.

SUMMARY

The present invention has been made in consideration of these circumstances, and an object thereof is to provide a technique for improving image quality of an object boundary part when 3D images are generated from a 2D image.

In order to solve the above-described problems, an image process device according to an aspect of the present invention includes a mask correcting unit configured to correct an externally set mask pattern; a depth map processing unit configured to process a depth map of an input image for each of a plurality of regions designated by a plurality of mask patterns corrected by the mask correcting unit; and an image generation unit configured to generate an image of a different viewpoint on the basis of the input image and depth maps processed by the depth map processing unit. The mask correcting unit includes a first low-pass filter configured to apply a filter to a mask signal; a binarization section configured to binarize the mask signal output from the first low-pass filter by using a first threshold value for moving a position of an edge of the mask signal; and a second low-pass filter configured to give a slant to the edge of the mask signal in which the position of the edge is moved through the binarization by the binarization section, thereby performing a blurring process on an object boundary part of the mask pattern.

Another aspect of the present invention is an image process method. This method includes performing a blurring process on an object boundary part of an externally set mask pattern; processing a depth map of an input image for each of a plurality of regions designated by a plurality of mask patterns in which the blurring process has been performed on the object boundary part; and generating an image of a different viewpoint on the basis of the input image and processed depth maps. The performing of the blurring process includes applying a low-pass filter to a mask signal; binarizing the mask signal to which the low-pass filter has been applied by using a first threshold value for moving a position of an edge of the mask signal; and applying a low-pass filter in order to give a slant to the edge of the mask signal in which the position of the edge is moved through the binarization.

In addition, any combination of above-described constituent elements, and expression of the present invention converted between a method, a device, a system, a recording medium, a computer program, and the like are also useful as aspects of the present invention.

DETAILED DESCRIPTION

The invention will now be described by reference to the preferred embodiments. This does not intend to limit the scope of the present invention, but to exemplify the invention.

Figure 1:
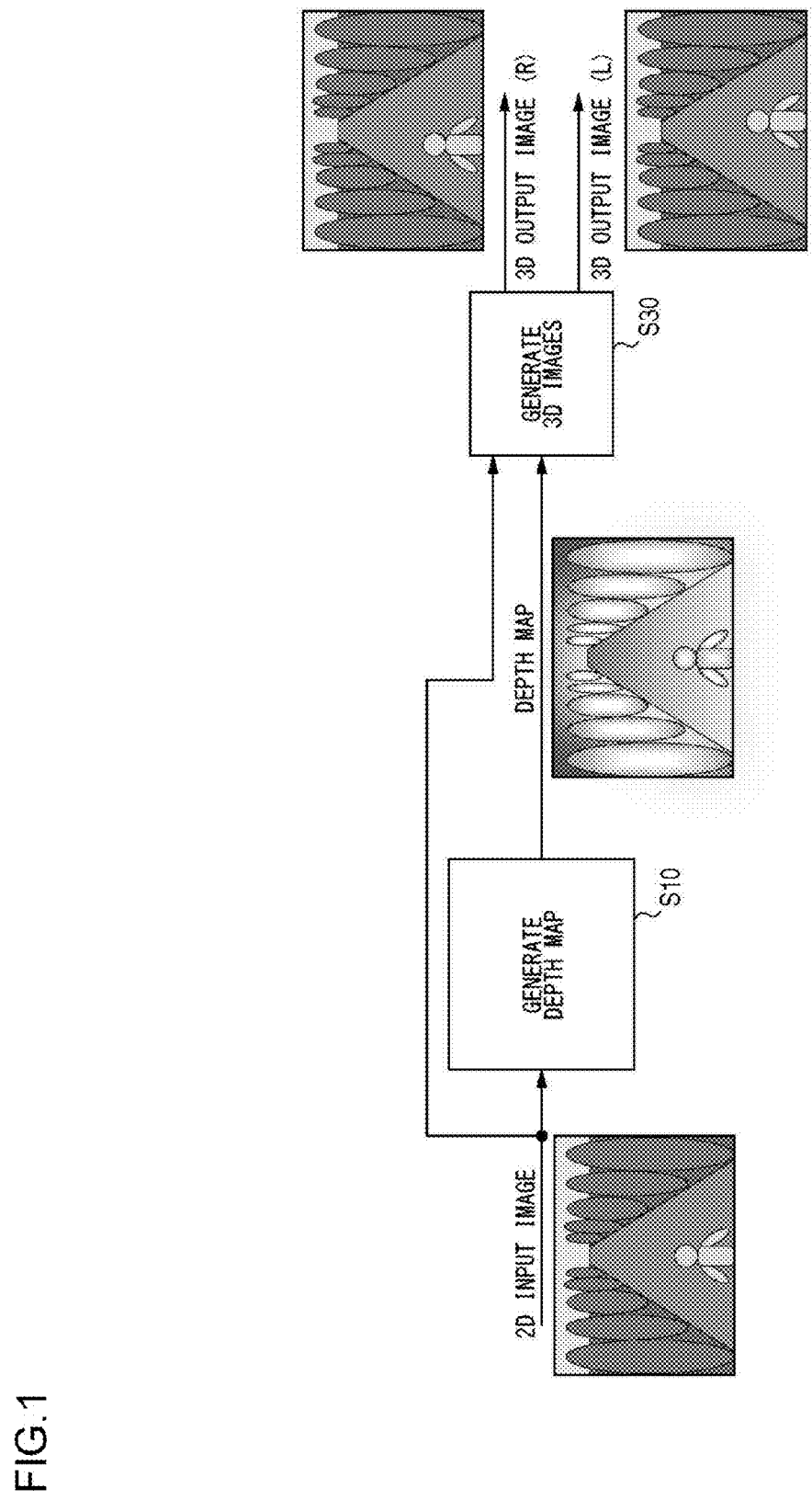
FIG. 1 is a diagram illustrating a basic process procedure of 2D-3D conversion.
Figure 2:
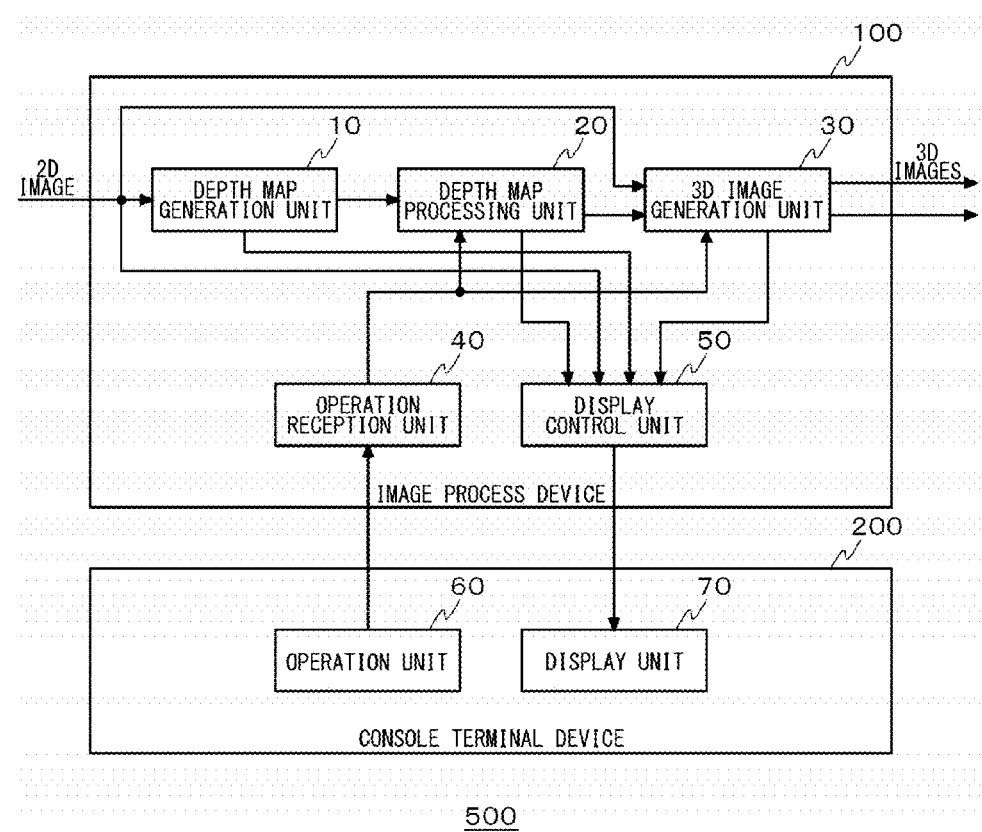
FIG. 2 is a diagram illustrating an image editing system according to a basic embodiment of the present invention.

FIG. 2 is a diagram illustrating a configuration of an image editing system 500 according to a basic embodiment of the present invention. The image editing system 500 according to the present embodiment includes an image process device 100 and a console terminal device 200.

The console terminal device 200 is a terminal device used for an image producer (hereinafter referred to as a user) to produce and edit an image. The console terminal device 200 includes an operation unit 60 and a display unit 70. The operation unit 60 is an input device such as a keyboard or a mouse, and the display unit 70 is an output device such as a display. In addition, a touch panel display in which input and output are integrated may be used. Further, the console terminal device 200 may include a user interface such as a printer or a scanner which uses a printed matter as a medium. The operation unit 60 receives a user operation, generates a signal caused by the user operation, and outputs the signal to the image process device 100. The display unit 70 displays an image generated by the image process device 100.

The image process device 100 includes a depth map generation unit 10, a depth map processing unit 20, a 3D image generation unit 30, an operation reception unit 40, and a display control unit 50. This configuration can be implemented by any processor, memory, and other LSI in terms of hardware, and be implemented by a program or the like loaded to a memory in terms of software, and, here, a functional block realized by a combination thereof is drawn. Therefore, this functional block which can be realized by only hardware, only software, or a combination thereof can be understood by a person skilled in the art. For example, in relation to the depth map generation unit 10, the depth map processing unit 20, and the 3D image generation unit 30, overall functions thereof may be realized by software, and, functions of the depth map generation unit 10 and the 3D image generation unit 30 may be configured by a dedicated logic circuit, and a function of the depth map processing unit 20 may be realized by software.

The depth map generation unit 10 generates a depth map of a 2D image on the basis of the input 2D image and a depth model. The depth map is a grayscale image which indicates a depth value by a luminance value. The depth map generation unit 10 estimates a scene structure and generates a depth map by using a depth model suitable for the scene structure. In the present embodiment, the depth map generation unit 10 combines a plurality of basic depth models so as to be used to generate a depth map. At this time, a combining ratio of a plurality of basic depth models is varied depending on the scene structure of the 2D image.

Figure 3:
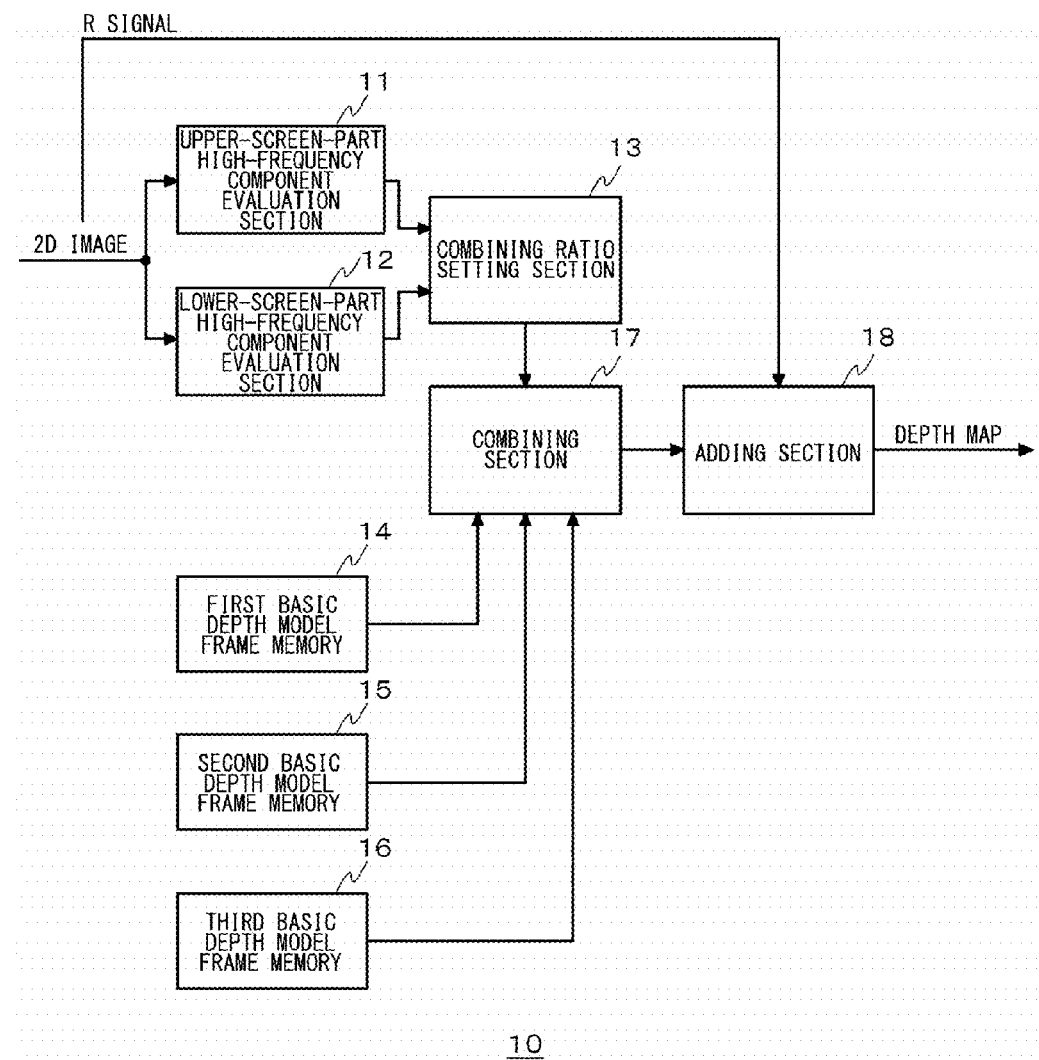
FIG. 3 is a diagram illustrating a configuration example of the depth map generation unit according to an embodiment of the present invention.

FIG. 3 is a diagram illustrating a configuration example of the depth map generation unit 10 according to the embodiment of the present invention. The depth map generation unit 10 includes an upper-screen-part high-frequency component evaluation section 11, a lower-screen-part high-frequency component evaluation section 12, a combining ratio setting section 13, a first basic depth model frame memory 14, a second basic depth model frame memory 15, a third depth model frame memory 16, a combining section 17, and an adding section 18.

The upper-screen-part high-frequency component evaluation section 11 calculates a ratio of pixels having a high frequency component in an upper screen part of a 2D image to be processed. The ratio is set as a high frequency component evaluation value of the upper screen part. In addition, a ratio of the upper screen part to the entire screen may be set to approximately 20%. The lower-screen-part high-frequency component evaluation section 12 calculates a ratio of pixels having a high frequency component in a lower screen part of the 2D image. The ratio is set as a high frequency component evaluation value of the lower screen part. In addition, a ratio of the lower screen part to the entire screen may be set to approximately 20%.

The first basic depth model frame memory 14 holds a first basic depth model, the second basic depth model frame memory 15 holds a second basic depth model, and the third basic depth model frame memory 16 holds a third basic depth model. The first basic depth model is a model with a spherical surface in which the upper screen part and the lower screen part are in a concave state. The second basic depth model is a model with a cylindrical surface in which the upper screen part has an axial line in the longitudinal direction, and with a spherical surface in which the lower screen part is in a concave state. The third basic depth model is a model with a plane on the upper screen part and with a cylindrical surface in which the lower screen part has an axial line in the transverse direction.

The combining ratio setting section 13 sets combining ratios k1, k2 and k3 (where k1+k2+k3=1) of the first basic depth model, the second basic depth model, and the third basic depth model, based on the high frequency component evaluation values of the upper screen part and the lower screen part which are respectively calculated by the upper-screen-part high-frequency component evaluation section 11 and the lower-screen-part high-frequency component evaluation section 12. The combining section 17 multiplies the combining ratios k1, k2 and k3 by the first basic depth model, the second basic depth model, and the third basic depth model, respectively, and adds the respective multiplication results to each other. This calculation result is a combined basic depth model.

For example, in a case where the high frequency component evaluation value of the upper screen part is small, the combining ratio setting section 13 recognizes a scene in which the sky or a flat wall is present in the upper screen part, and increases a ratio of the second basic depth model so as to increase the depth of the upper screen part. In addition, in a case where the high frequency component evaluation value of the lower screen part is small, a scene in which a flat ground or a water surface continuously extends in front in the lower screen part is recognized, and a ratio of the third basic depth model is increased. In the third basic depth model, the upper screen part is approximated to a plane as a distant view, and the lower screen part is gradually decreased in a depth toward the lower part.

The adding section 18 superimposes a red component (R) signal of the 2D image on the combined basic depth model generated by the combining section 17. The use of the R signal is based on the experimental rule that there is a high possibility that the magnitude of the R signal may conform to unevenness of a subject in circumstances in which the magnitude of the R signal is close to that of pure light and in a condition in which the brightness of a texture is not greatly different. In addition, the reason for red and warm color usages is that those colors are advancing colors and are recognized as being further in front than cool colors, and thereby a stereoscopic effect is emphasized.

The description will be continued with reference to FIG. 2. The depth map processing unit 20 processes the depth map generated by the depth map generation unit 10. In the present embodiment, the depth map processing unit 20 individually or independently processes depth maps generated by the depth map generation unit 10 for a plurality of respective regions designated by a plurality of externally set mask patterns (hereinafter simply referred to as masks). For example, processings such as a gain adjusting process, an offset adjusting process, and a gradation process are performed. A process by the depth map processing unit 20 will be described in detail later.

The 3D image generation unit 30 generates a 2D image of a different viewpoint based on the above-described 2D image and the depth maps processed by the depth map processing unit 20. The 3D image generation unit 30 outputs the 2D image of an original viewpoint and the 2D image of a different viewpoint as a right eye image and a left eye image.

Hereinafter, a description will be made of a detailed example in which a 2D image of a different viewpoint having parallax with a 2D image of an original viewpoint is generated using the 2D image and depth maps. In this detailed example, the 2D image of the different viewpoint of which a viewpoint is shifted to the left is generated when using a viewpoint in displaying the 2D image of the original viewpoint on a screen as a reference. In this case, when a texture is displayed as a near view with respect to an observer, a texture of the 2D image of the original viewpoint is moved to the left side of the screen by a predetermined amount, and, when the texture is displayed as a distant view with respect to the observer, the texture is moved to the right side of the screen by a predetermined amount.

A luminance value of each pixel of a depth map is set to Yd, a congestion value indicating the sense of protrusion is set to m, and a depth value indicating the stereoscopic effect is set to n. The 3D image generation unit 30 shifts a texture of the 2D image of the original viewpoint corresponding to a luminance value Yd to the left in order from a small value of the luminance value Yd for each pixel by a (Yd−m)/n pixel. In a case where a value of (Yd−m)/n is negative, the texture is shifted to the right by a (m−Yd)/n pixel. In addition, to the observer, a texture having a small luminance value Yd of the depth map is observed inside the screen, and a texture having a large luminance value Yd is observed in front of the screen. The luminance value Yd, the congestion value m, and the depth value n are values ranging from 0 to 255, and, for example, the congestion value m is set to 200, and the depth value n is set to 20.

In addition, more detailed description of generation of a depth map by the depth map generation unit 10 and generation of 3D images by the 3D image generation unit 30 is disclosed in JP-A Nos. 2005-151534 and 2009-44722 which were filed previously by the present applicant.

The operation reception unit 40 receives a signal input from the operation unit 60 of the console terminal device 200. The operation reception unit 40 outputs the input signal to the depth map processing unit 20 or the 3D image generation unit 30 depending on the content thereof. The display control unit 50 controls the display unit 70 of the console terminal device 200. Specifically, the display control unit 50 can display 2D input images, depth maps generated by the depth map generation unit 10, depth maps processed by the depth map processing unit 20, and 3D images generated by the 3D image generation unit 30.

Figure 4:
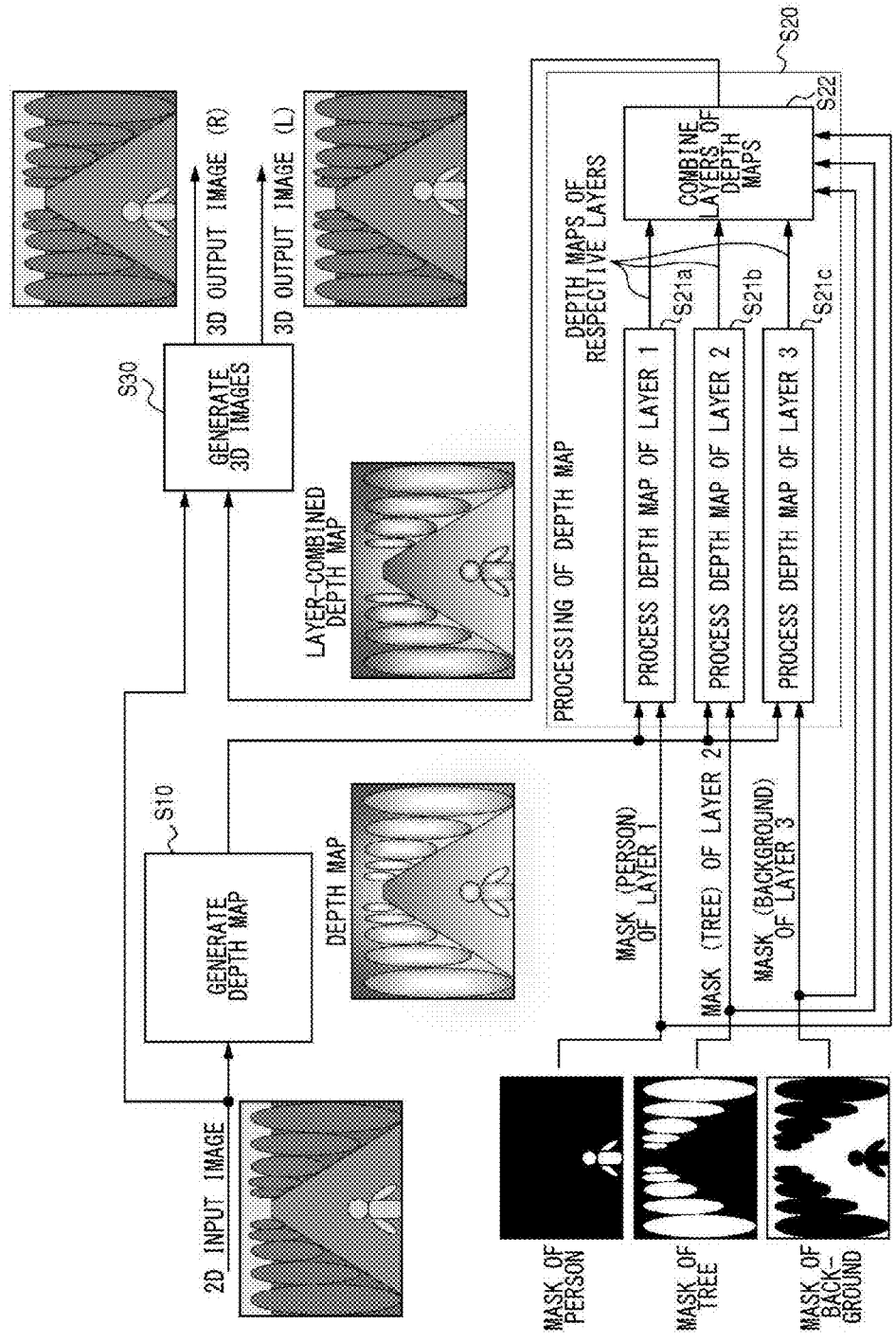
FIG. 4 is a diagram illustrating overall process procedures of the image editing system according to the basic embodiment of the present invention.

FIG. 4 is a diagram illustrating overall process procedures of the image editing system 500 according to a basic embodiment of the present invention. Generally, a 2D image includes a plurality of objects. The 2D input image of FIG. 4 includes three objects. Specifically, person, tree and background objects are included. First, the depth map generation unit 10 generates a depth map from the 2D input image (step S10). The depth map indicates that the closer to white, the higher the luminance and the shorter the distance from an observer, and the closer to black, the lower the luminance and the longer the distance from the observer. In a case of generating 3D images, a protrusion amount increases as much as a region close to white of the depth map, and a withdrawal amount increases as much as a region close to black.

In the present embodiment, in order to individually adjust the sense of depth for a plurality of objects in an image, an effect is independently adjusted for each object region in a depth map. Specifically, each object region is specified in a depth map using a plurality of masks indicating the respective object regions in the image. In addition, an effect is individually adjusted for each specified object region, and a plurality of effect-adjusted depth maps are obtained. Further, a single depth map is generated by combining the plurality of depth maps. The depth map is used to generate a 2D image of a different viewpoint from a 2D image of an original viewpoint.

The depth map generation unit 10 automatically generates a depth map of a 2D input image (S10). The generated depth map is input to the depth map processing unit 20. A plurality of masks which respectively indicate a plurality of object regions in the 2D input image are also input to the depth map processing unit 20. These masks are generated based on outlines of the object regions which are traced by the user. For example, the display control unit 50 displays the 2D input image on the display unit 70, and the user traces outlines of regions which are used as the object regions in the 2D input image by using the operation unit 60. The operation reception unit 40 generates outline information of each object region on the basis of a signal from the operation unit 60, and outputs the outline information to the depth map processing unit 20 as a mask. In addition, a mask may be read by the image process device 100 by a scanner reading an outline drawn on a printed matter by the user.

In FIG. 4, a valid region of each mask is drawn white and an invalid region is drawn black. The mask of a person is a pattern in which only a region of the person is valid, and the other regions are invalid. The mask of a tree is a pattern in which only a region of the tree is valid, and the other regions are invalid. The mask of a background is a pattern in which only a region of the background is valid, and the other regions are invalid.

The number of masks per screen is not limited, and the user may set any number thereof. In addition, an object region may be set to a region which is decided as a single object region by the user. For example, as illustrated in FIG. 4, a single object region may be set in a single person, and an object region may be set for each site of the person, and, further, for each part of the site. Particularly, in order to generate high quality 3D images, a plurality of object regions may be set in a single person, and a thickness or a position in a depth direction may be adjusted for each site, and, further, for each part of the site.

The depth map processing unit 20 processes the depth map (hereinafter, referred to as an input depth map) input from the depth map generation unit 10 by using a plurality of masks input via a user interface (S20). The depth map processing unit 20 individually processes the depth map for each region specified by each mask. Hereinafter, the process of the depth map for each region is referred to as a layer process. In addition, a layer-processed depth map is referred to as a layer depth map. In the present specification, the layer is used as a concept indicating the unit of a process on a valid region of a mask.

In FIG. 4, as an example, the depth map processing unit 20 specifies a region of the person from the input depth map by using a mask of the person (a mask of a layer 1), thereby performing the layer process (S21a). Similarly, a region of the tree is specified from the input depth map by using a mask of the tree (a mask of a layer 2), thereby performing the layer process (S21b). Similarly, a region of the background is specified from the input depth map by using a mask of the background (a mask of a layer 3), thereby performing the layer process (S21c).

The depth map processing unit 20 combines the depth maps of the respective object regions of the layer depth maps of the layers 1 to 3 (S22). This depth map obtained through the combination is referred to as a combined depth map. The 3D image generation unit 30 shifts pixels of the 2D input image by using the combined depth map, and generates an image having parallax with the 2D input image (S30). The 3D image generation unit 30 outputs the 2D input image as a right eye image (R) of 3D output images and the generated image as a left eye image (L).

First, an example of adjusting a gain will be described as the layer process by the depth map processing unit 20. The gain adjustment is a process for adjusting a thickness of an object in the depth direction. If a gain increases, an object is thickened, and, if the gain decreases, the object is thinned.

Figure 5:
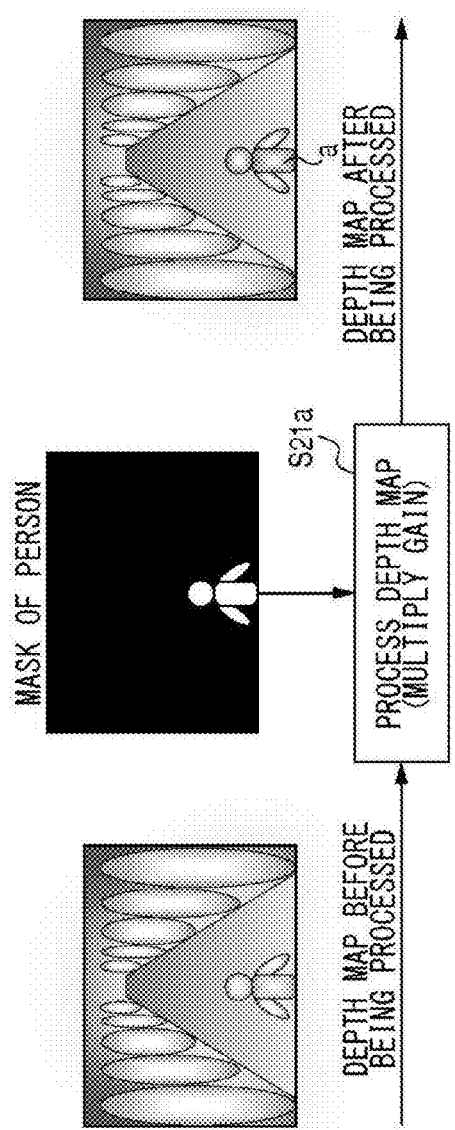
FIG. 5 is a diagram illustrating a gain adjusting procedure of an input depth map.

FIG. 5 is a diagram illustrating a gain adjusting procedure of an input depth map. The depth map processing unit 20 multiplies a gain only by the valid region of the mask of the person in the input depth map which is a depth map before being processed, thereby increasing the amplitude of a depth value of only the person part of the input depth map (S21a). In FIG. 5, the amplitude of the person part increases in the layer depth map which is a depth map after being processed (refer to the reference sign a).

Next, an example of adjusting an offset will be described as the layer process by the depth map processing unit 20. The offset adjustment is a process for adjusting a position of an object in the depth direction. If a positive offset value is added, an object is moved in a direction in which the object protrudes, and, if a negative offset value is added, the object is moved in a direction in which the object withdraws.

Figure 6:
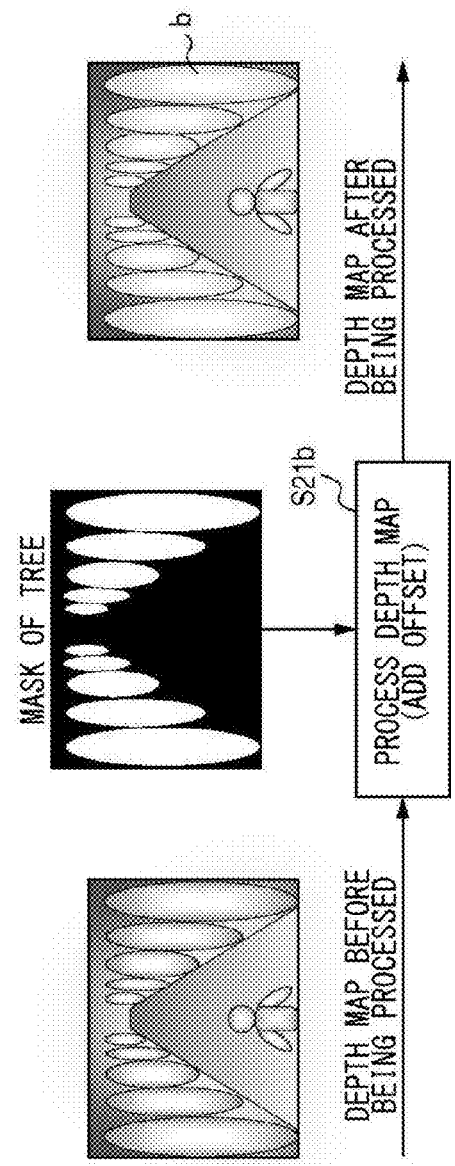
FIG. 6 is a diagram illustrating an offset adjusting procedure of the input depth map.

FIG. 6 is a diagram illustrating an offset adjusting procedure of the input depth map. The depth map processing unit 20 adds an offset to only the valid region of the mask of the tree in the input depth map which is a depth map before being processed, thereby increasing a level of a depth value of the tree part in the input depth map (S21b). In FIG. 6, a level of the tree part increases in the layer depth map which is a depth map after being processed (refer to the reference sign b).

Figure 7:
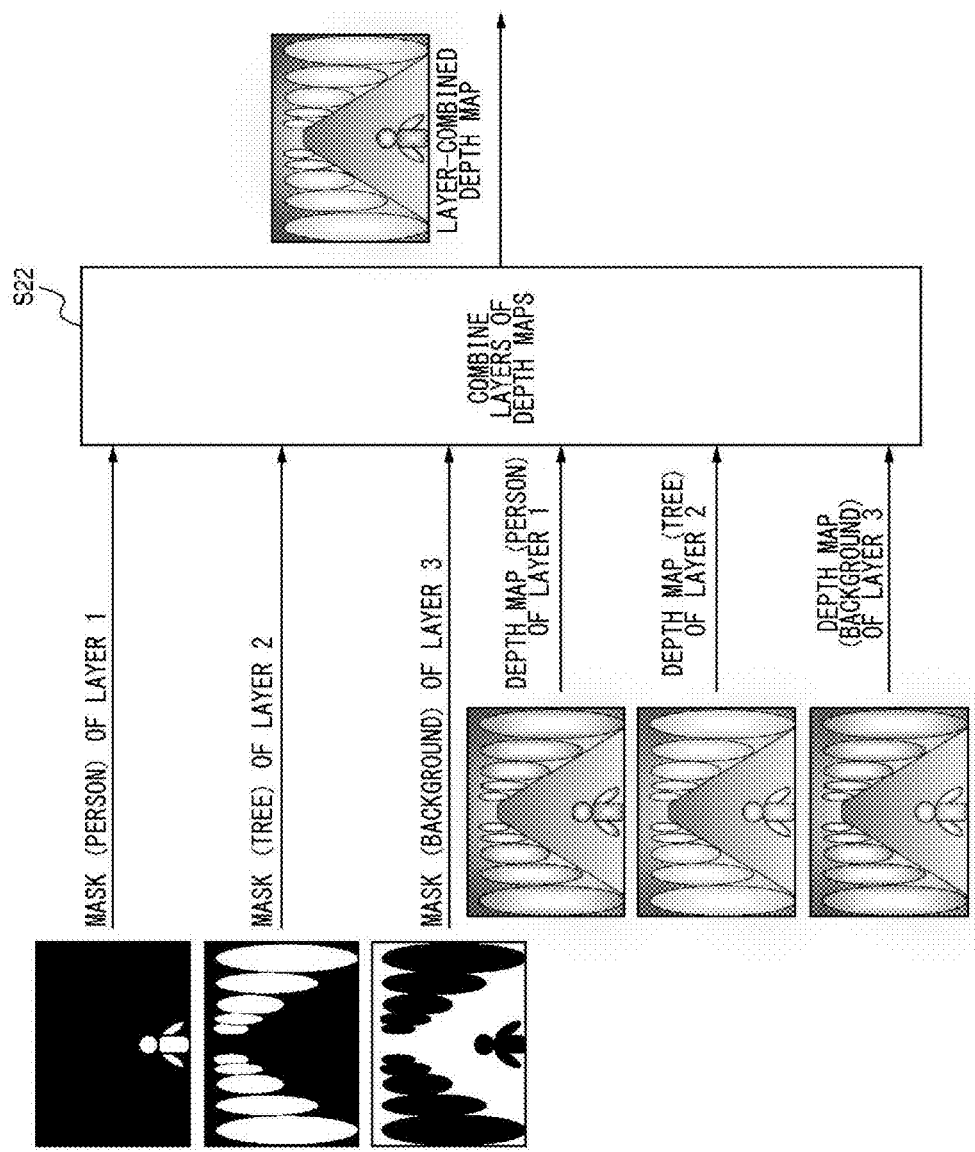
FIG. 7 is a diagram illustrating a combining process procedure of layer depth maps.

FIG. 7 is a diagram illustrating a combining process procedure of layer depth maps. The depth map processing unit 20 cuts only a valid region of the mask (the mask of the person) of the layer 1 from the layer depth map of the layer 1 (a depth map of the person). Similarly, only a valid region of the mask (the mask of the tree) of the layer 2 is cut from the layer depth map of the layer 2 (a depth map of the tree). Similarly, only a valid region of the mask (the mask of the background) of the layer 3 is cut from the layer depth map of the layer 3 (a depth map of the background). The depth map processing unit 20 combines the three cut depth maps so as to generate a combined depth map.

Figure 8:
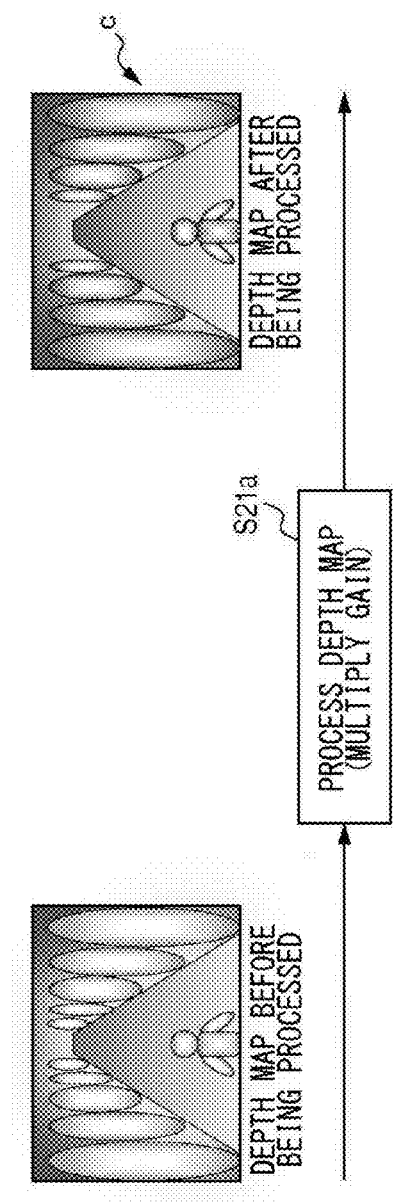
FIG. 8 is a diagram illustrating a gain adjusting procedure of an input depth map in which a mask is not used.

FIG. 8 is a diagram illustrating a gain adjusting procedure of an input depth map in which a mask is not used. When the layer depth maps are combined, if only a valid region of a mask of each layer depth map is used, an invalid region of the mask of each layer depth map is not reflected on a combined depth map. Therefore, the depth map processing unit 20 multiplies a gain by the entire input depth map so as to increase the amplitude of a depth value of the entire input depth map (S21a). In FIG. 8, the amplitude of the entire layer depth map increases (refer to the reference sign c).

Figure 9:
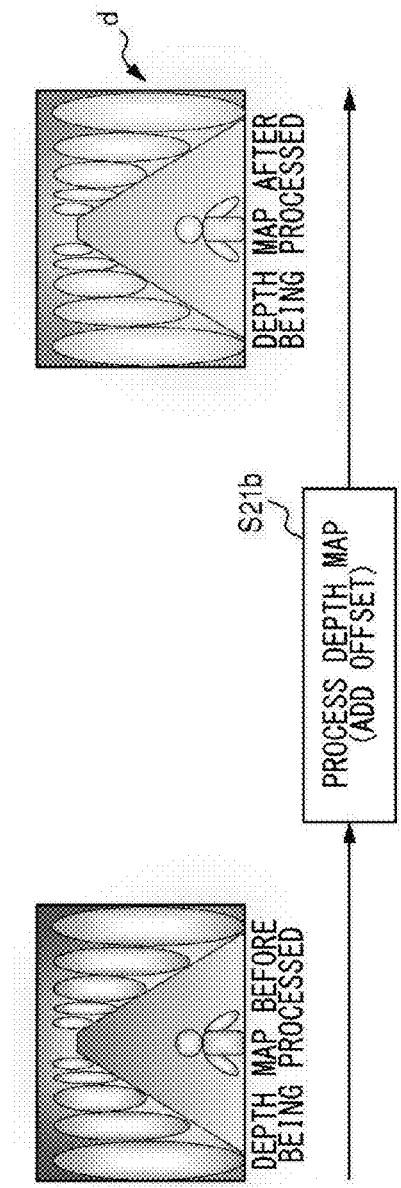
FIG. 9 is a diagram illustrating an offset adjusting procedure of an input depth map in which a mask is not used.

FIG. 9 is a diagram illustrating an offset adjustment procedure of an input depth map in which a mask is not used. When the layer depth maps are combined, if only a valid region of a mask of each layer depth map is used, an invalid region of the mask of each layer depth map is not reflected on a combined depth map. Therefore, the depth map processing unit 20 adds an offset to the entire input depth map so as to increase the level of a depth value of the entire input depth map (S21b). In FIG. 9, the level of the entire layer depth map increases (refer to the reference sign d).

Figure 10:
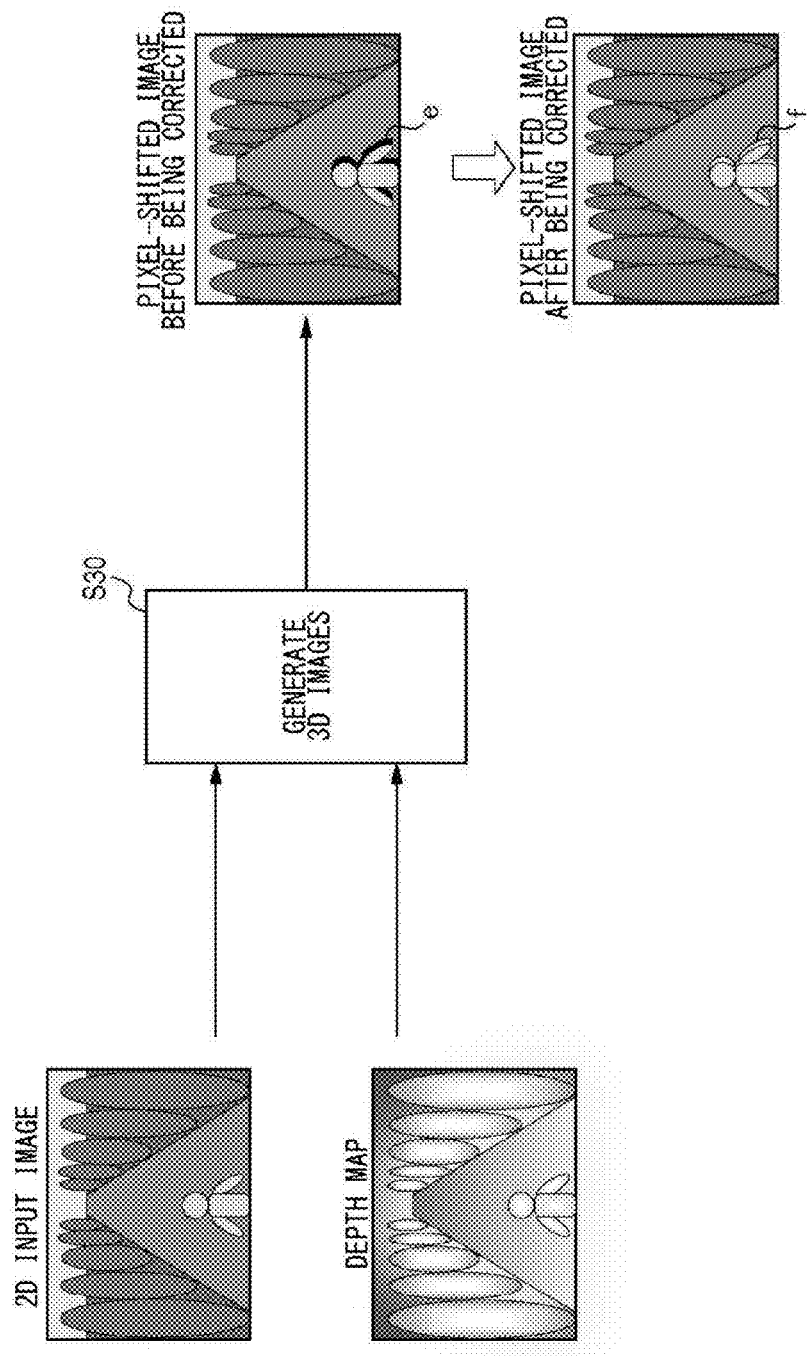
FIG. 10 is a diagram illustrating pixel shift and pixel interpolation.

FIG. 10 is a diagram illustrating pixel shift and pixel interpolation. The 3D image generation unit 30 shifts pixels of a 2D input image on the basis of a combined depth map and generates an image having parallax with the 2D input image (S30). FIG. 10 illustrates an example in which pixels of a person region in a 2D input image are shifted to the left. In the depth map of FIG. 10, an offset value is added to a depth value of the person region, and thus the depth value of the person region increases. If the depth value of the person region increases, a protrusion amount of the person region of 3D images increases.

When the pixels of only the person region are shifted without shifting the pixels of the peripheral background region of the person region, an omitted pixel region with no pixels may occur (refer to the reference sign e of the pixel-shifted image before being corrected). The 3D image generation unit 30 interpolates the omitted pixel region using pixels generated from peripheral pixels, thereby correcting the omitted pixel region. There are various methods for pixel interpolation, and, for example, the interpolation is performed using pixels in the boundary of the person region (refer to the reference sign f of the pixel-shifted image after being corrected).

Figure 11:
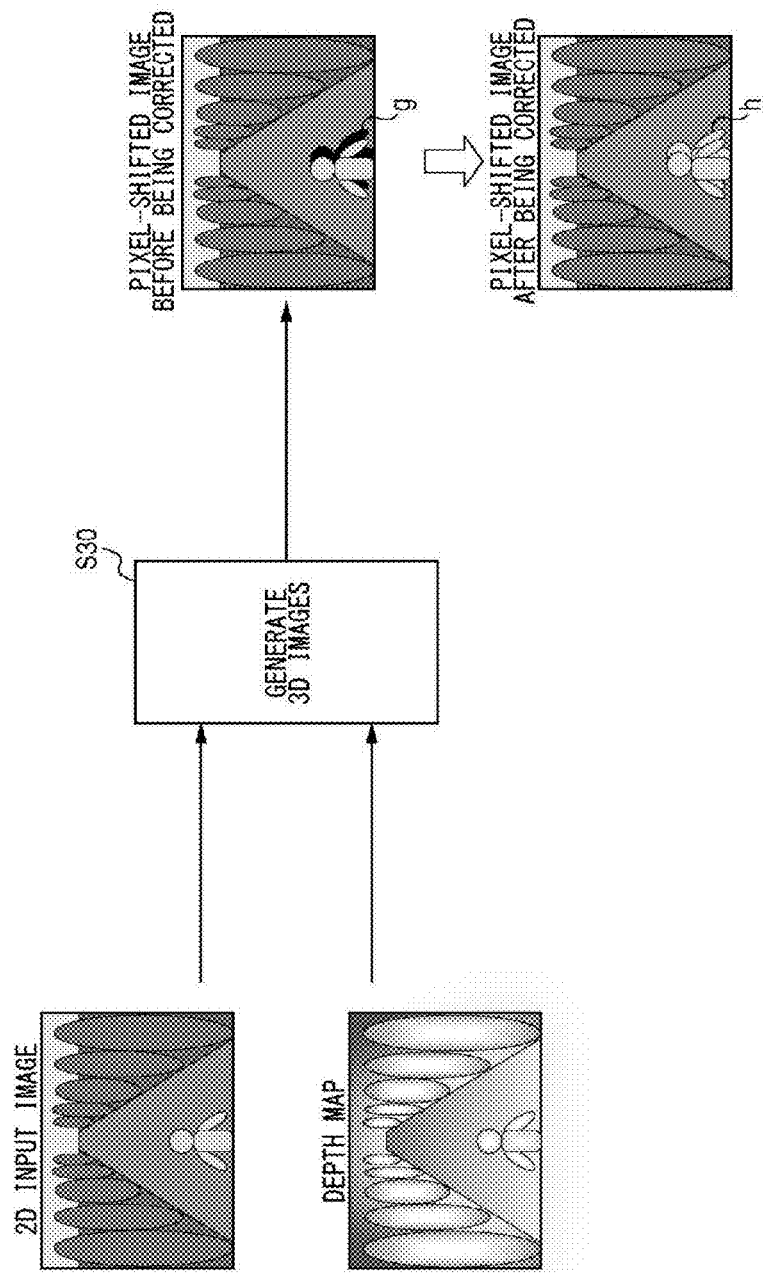
FIG. 11 is a diagram illustrating pixel shift and pixel interpolation in a case where a step-difference in depths of an object boundary is large.

FIG. 11 is a diagram illustrating pixel shift and pixel interpolation in a case where a step-difference in depths of an object boundary is large. In a case where a step-difference in depths of an object boundary is large, a pixel shift amount also increases, and thus the area of an omitted pixel region increases accordingly. When the omitted pixel region is interpolated using pixels generated from peripheral pixels, the area of an interpolated region also increases, and, thus, awkwardness, mismatch, and incompatibility of an image are visible in the object boundary.

In FIG. 11, a pixel shift amount of the person region becomes larger than in FIG. 10. The area of the omitted pixel region of the pixel-shifted image before being corrected in FIG. 11 is larger than the area in FIG. 10 (refer to the reference sign g). In the same manner as the pixel-shifted image after being corrected in FIG. 10, the omitted pixel region is also interpolated using pixels of the boundary of the person region in the pixel-shifted image after being corrected in FIG. 11. The omitted pixel region is a region which is originally a background region, and, if the region increases, a shape of the person is destroyed (refer to the reference sign h).

In addition, there is an object with a clear boundary and there is an object with an unclear boundary in the image. The unclear boundary of the object is caused by, for example, defocus at the time of photographing, camera shaking, motion blur, and the like. In a case where an object boundary is unclear and vague, it is difficult to create an appropriate mask conforming to the object boundary. When processing of a depth map, pixel shift, and pixel interpolation are performed using a mask created with an incorrect outline, an outline of an object of a generated 3D image tends to be awkward.

Figure 12:
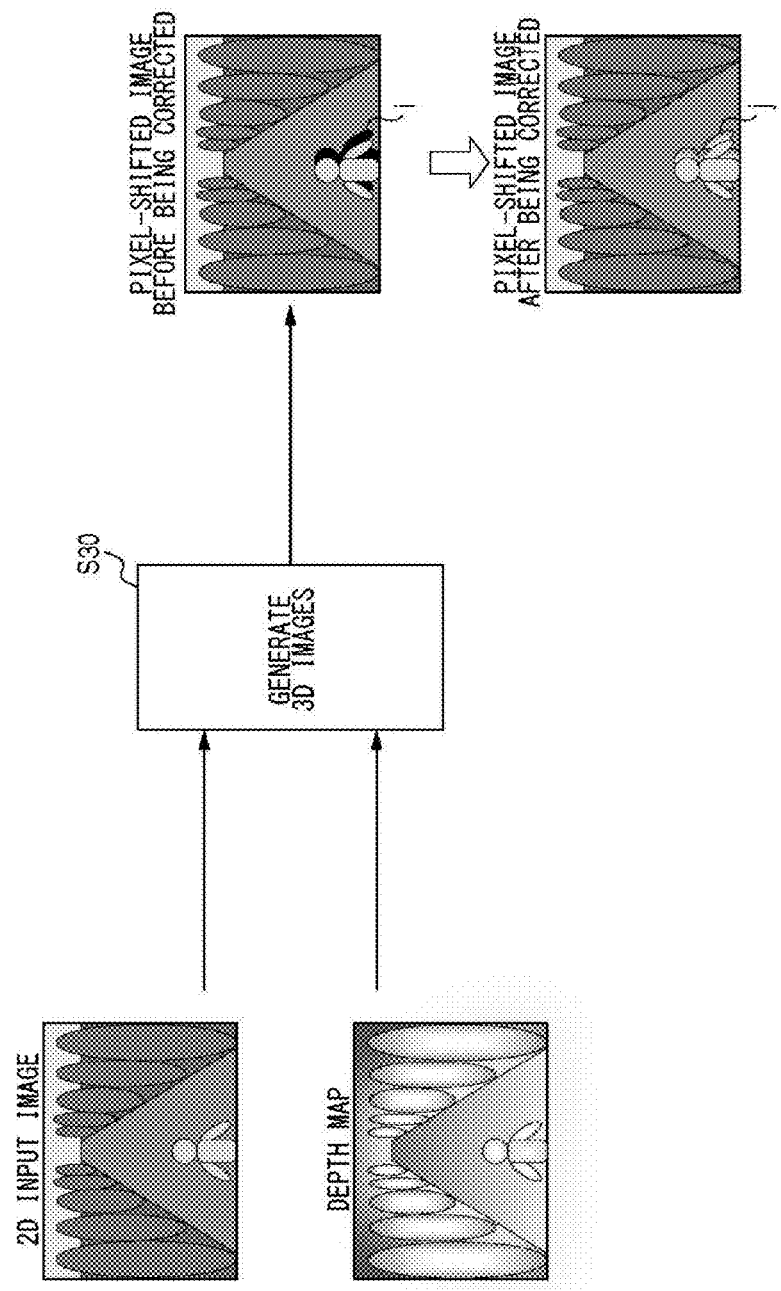
FIG. 12 is a diagram illustrating pixel shift and pixel interpolation in which awkwardness does not occur even in a case where a step-difference in depths of an object boundary is large.

FIG. 12 is a diagram illustrating pixel shift and pixel interpolation in which awkwardness does not occur even in a case where a step-difference in depths of an object boundary is large. Despite the area of an omitted pixel region being large in the object boundary, interpolation is performed such that the person and the background smoothly change, and thereby awkwardness of the object boundary may become hardly visible.

The area of the omitted pixel region of the pixel-shifted image before being corrected in FIG. 12 is also larger than the area in FIG. 10 in the same manner as in FIG. 11 (refer to the reference sign i). In the pixel-shifted image after being corrected in FIG. 12, awkwardness in the boundary between the person and the background can be hardly visible unlike in the pixel-shifted image after being corrected in FIG. 11 (refer to the reference sign j).

Figure 13:
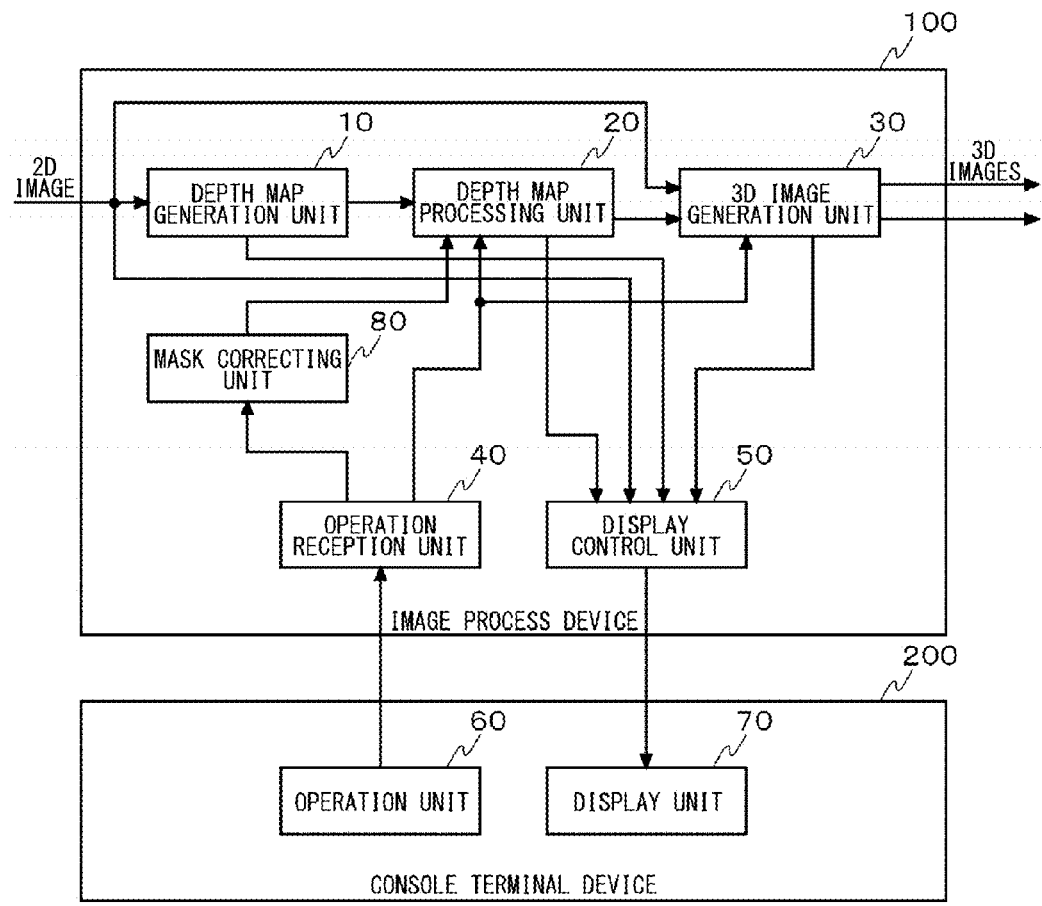
FIG. 13 is a diagram illustrating a configuration of an image editing system according to Embodiment 1 of the present invention.

FIG. 13 is a diagram illustrating a configuration of an image editing system 500 according to Embodiment 1 of the present invention. In the image editing system 500 according to Embodiment 1, a mask correcting unit 80 is added to the image process device 100 of the image editing system 500 according to the basic embodiment of FIG. 2. Hereinafter, a description will be made of a difference between the image editing system 500 according to Embodiment 1 of FIG. 13 and the image editing system 500 according to the basic embodiment of FIG. 2.

The mask correcting unit 80 corrects a mask set from the console terminal device 200 via the operation reception unit 40 and outputs the corrected mask to the depth map processing unit 20. Specifically, the mask correcting unit 80 performs a blurring process on an object boundary of the mask. The depth map processing unit 20 alpha-blends depth maps of a plurality of object regions, generated based on the masks corrected by the mask correcting unit 80. In other words, the depth map processing unit 20 combines a plurality of layer depth maps according to coefficients (a values) defined in the respective masks.

Figure 14:
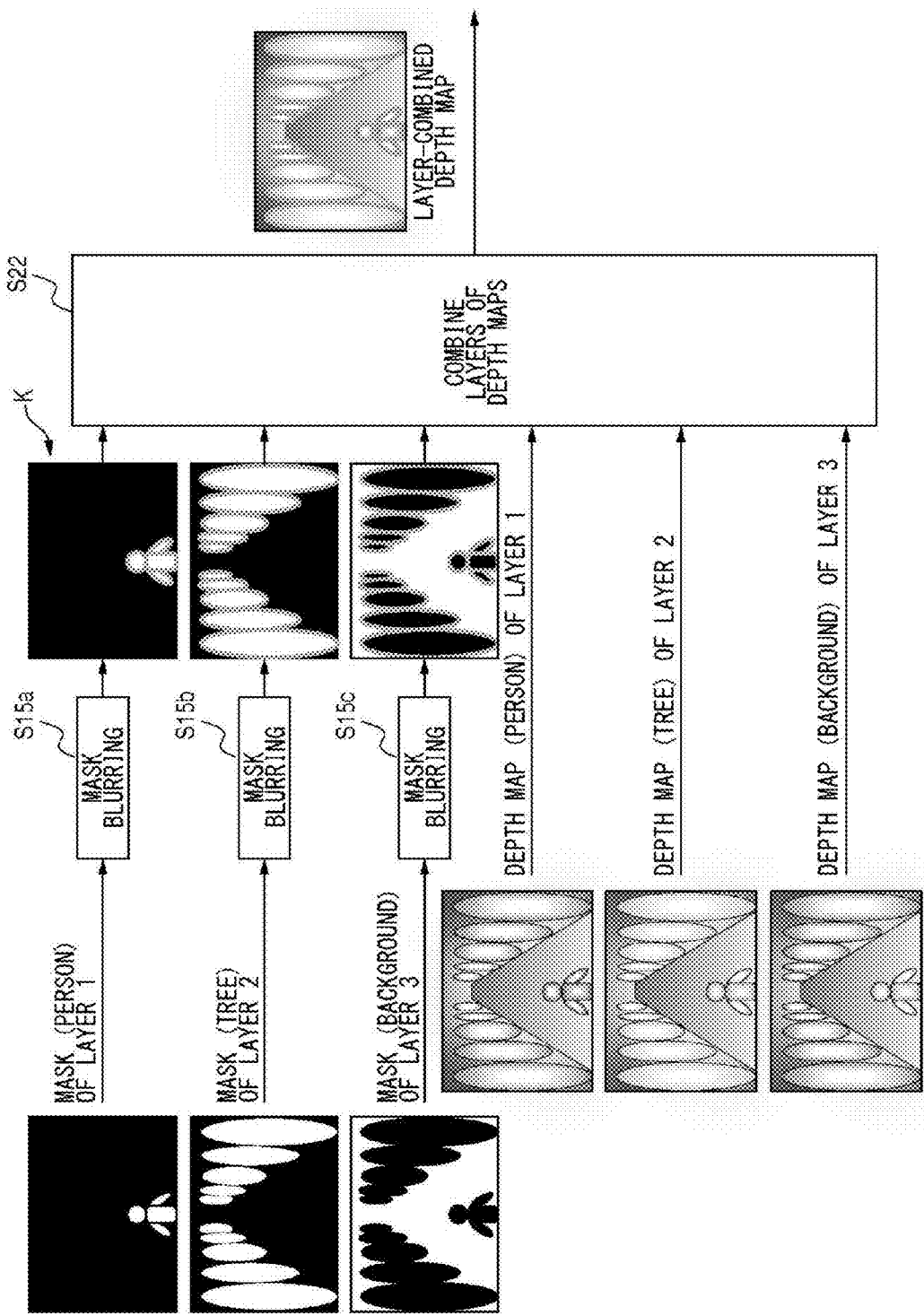
FIG. 14 is a diagram illustrating overall process procedures of the image editing system according to Embodiment 1 of the present invention.

FIG. 14 is a diagram illustrating overall process procedures of the image editing system 500 according to Embodiment 1 of the present invention. The process procedure of FIG. 14 includes a mask blurring process added to the process procedure of FIG. 4. Hereinafter, a difference therebetween will be described. In addition, in the following description, a pixel value in a valid region (drawn white in the figure) of a mask is set to 1, and a pixel value in an invalid region (drawn black in the figure) is set to 0.

In Embodiment 1, the mask of the layer 1 (the mask of the person), the mask of the layer 2 (the mask of the tree), and the mask of the layer 3 (the mask of the background) which are output from the operation reception unit 40 are input to the mask correcting unit 80 before being input to the depth map processing unit 20. The mask correcting unit 80 performs a mask blurring process on the object boundary part of each mask (S15a to S15c). Specifically, the mask correcting unit 80 corrects values of an edge (that is, a boundary between 0 and 1) and a peripheral region thereof (hereinafter both of them are collectively referred to as an edge region) of a mask signal to values between 0 and 1 (0 and 1 are excluded) (refer to the reference sign k).

The depth map processing unit 20 combines layer depth maps according to levels of the corrected masks (S22). Thereby, it is possible to generate a combined depth map in which a depth value is smoothly varied in the edge region of the mask. The 3D image generation unit 30 performs pixel shift and pixel interpolation using the combined depth map. Thereby, the object boundary is gently varied, and thus awkwardness of the object boundary is not visible.

Figure 15:
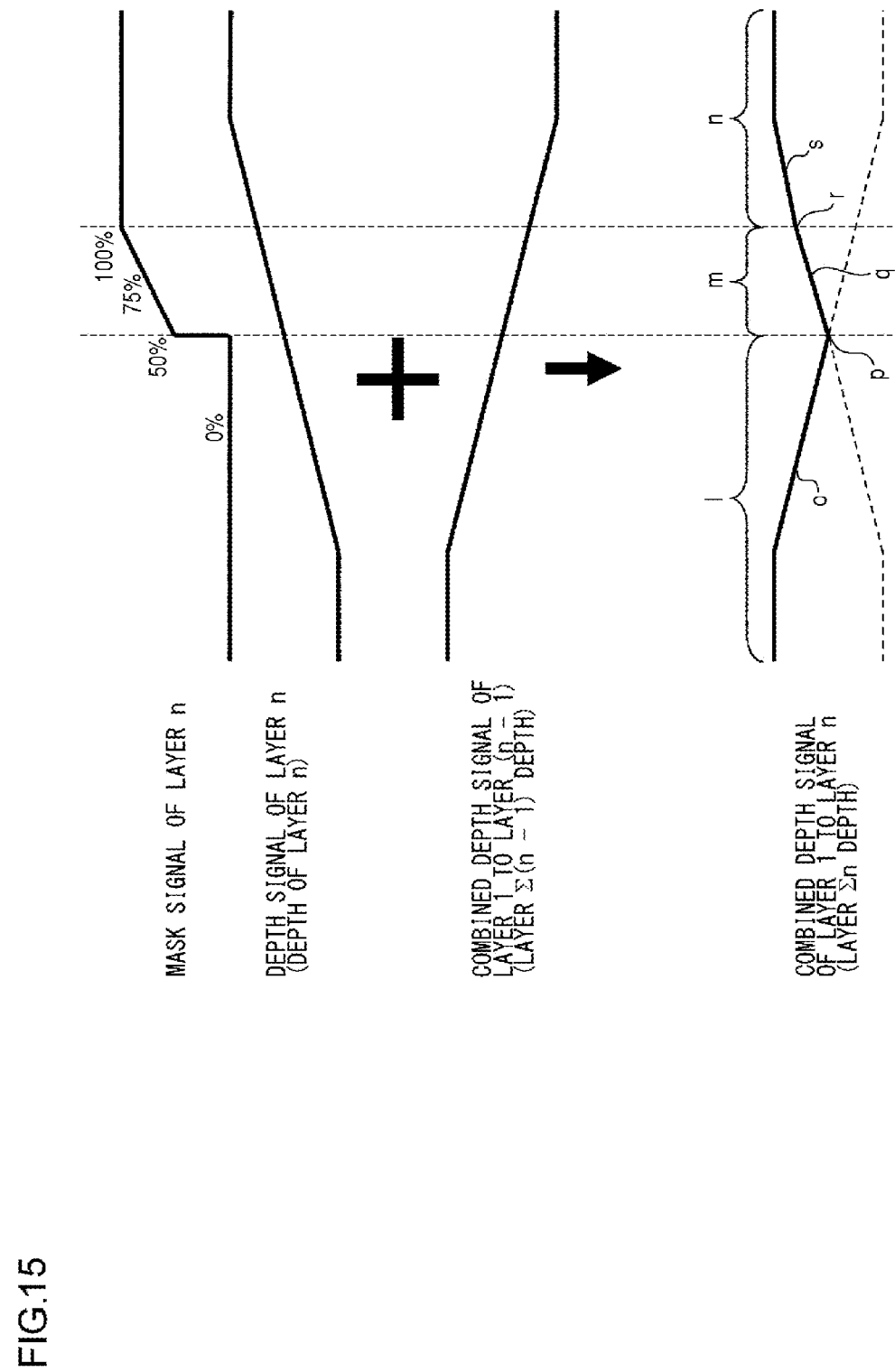
FIG. 15 is a diagram illustrating alpha-blending of layer depth maps.

FIG. 15 is a diagram illustrating alpha-blending of layer depth maps. The depth map processing unit 20 determines a blending ratio of depth values of the respective layer depth maps on the basis of the values of the mask signals corrected by the mask correcting unit 80. The respective layer depth maps are superimposed in a designated order. The order to be superimposed is input by the user from the operation unit 60, and is set in the depth map processing unit 20 via the operation reception unit 40. In the example of the present specification, the layer depth map of the background, the layer depth map of the tree, and the layer depth map of the person are superimposed in this order.

In FIG. 15, an edge region of a mask signal of a layer n (where n is a natural number) includes a vertical rising edge from 0% to 50% and a gentle slant from 50% to 100%. The numerical value of each percentage indicates a combining ratio. Using the mask signal of the layer n, a depth signal of the layer n (hereinafter, referred to as a layer n depth) is blended with a combined depth signal of a layer $\Sigma(n-1)$ (hereinafter, referred to as a layer $\Sigma(n-1)$ depth). The layer $\Sigma(n-1)$ depth is a combined depth signal obtained by blending depth signals from the layer 1 to the layer $(n-1)$, that is, a combined depth signal which is generated up to a time point when the layer n depth is blended.

During a period (refer to the reference sign l) when a combining ratio of the mask signal of the layer n is 0%, the layer n depth of 0% is blended with the layer $\Sigma(n-1)$ depth of 100%. That is to say, the layer $\Sigma(n-1)$ depth is not overwritten by the layer n depth, and the layer $\Sigma(n-1)$ depth is output as it is (refer to the reference sign o). At the time point when a combining ratio of the mask signal of the layer n is 50% (refer to the reference sign p), the layer n depth of 50% is blended with the layer $\Sigma(n-1)$ depth of 50%.

During the period when a combining ratio of the mask signal of the layer n is 50% to 100% (refer to the reference sign m), the layer n depth is blended with the layer $\Sigma(n-1)$ depth whilst the combining ratio varies. For example, at the time point when a combining ratio of the mask signal of the layer n is 75% (refer to the reference sign q), the layer n depth of 75% is blended with the layer $\Sigma(n-1)$ depth of 25%. The layer n depth of 100% is blended with the layer $\Sigma(n-1)$ depth of 0% from the time point (refer to the reference sign r) when a combining ratio of the mask signal of the layer n reaches 100%. During the period (refer to the reference sign n) when a combining ratio of the mask signal of the layer n is 100%, the layer $\Sigma(n-1)$ depth is completely overwritten by the layer n depth, and, as a result, the layer n depth is output as it is (refer to the reference sign s). Thereby, a layer $\Sigma n$ depth is generated. The layer $\Sigma n$ depth is a combined depth signal obtained by blending depth signals from the layer 1 to the layer n.

In addition, the mask signal of the layer $\Sigma(n-1)$ depth is not used when the layer depths are blended. A combining ratio of the layer $\Sigma n$ depth and the layer $\Sigma(n-1)$ depth is determined only by the mask signal of the layer $\Sigma n$ depth. Therefore, in a region where the layer depths overlap much, a depth value of a lower layer depth decreases as layer depths overlap.

Hereinafter, a process of blurring an edge of a mask signal will be described in detail. This blurring process includes the following three basic steps. First, an edge of an original mask signal is moved so as to be appropriately positioned for an outline of a target object. Thereby, the area of the object boundary of the mask is enlarged or reduced. Next, a slant is given to the edge of the mask. Finally, the edge region of the mask given the slant is limited.

Hereinafter, a description will be made of a method in which the above-described blurring process is performed using a low-pass filter. First, a low-pass filter is applied to a mask where a level of a black part is 0 and a level of a white part is 1. Thereby, it is possible to generate a mask where a slant of an intermediate level between 0 and 1 is given to the edge region without varying a level of a flat part.

Further, there are cases where a slant is desired to be given to only outside of a valid region of a mask and a level before being processed is desired to be maintained inside thereof in the edge region of the mask. In addition, conversely, there are cases where a slant is desired to be given to only the inside of the valid region of the mask and a level before being processed is desired to be maintained in the outside thereof in the edge region of the mask. In consideration of these cases, a process of moving the edge of the mask signal to any position by enlarging or reducing the valid region of the mask is inserted into a front stage of a low-pass filter for generating a blurring mask.

In addition, a process of limiting the blurred edge region is inserted into a rear stage of the low-pass filter for generating a blurring mask in order to prevent the edge of the mask from being enlarged more than an intended amount through the blurring process. Hereinafter, the blurring process using the low-pass filter will be described more in detail.

Figure 16:
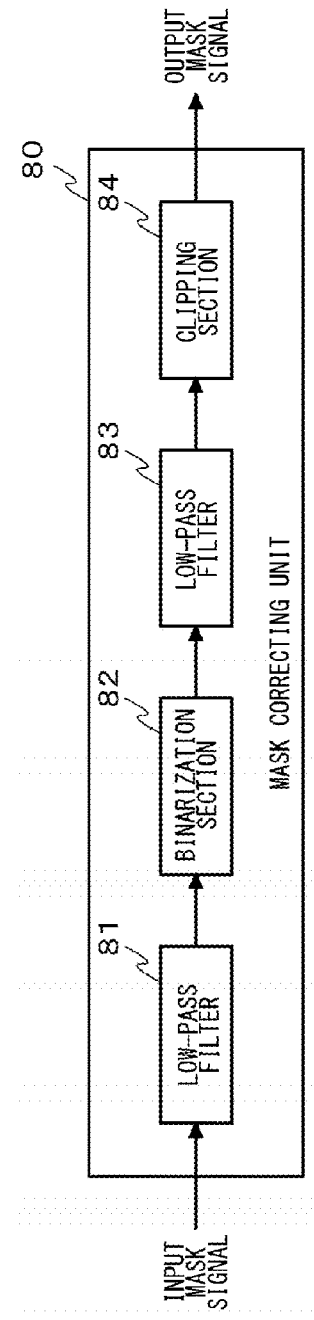
FIG. 16 is a diagram illustrating a configuration example of the mask correcting unit.

FIG. 16 is a diagram illustrating a configuration example of the mask correcting unit 80. The mask correcting unit 80 includes a first low-pass filter 81, a binarization section 82, a second low-pass filter 83, and a clipping section 84. This configuration can also be realized in various forms by only hardware, only software, or a combination thereof.

The first low-pass filter 81 in the first stage applies a low-pass filter to an original mask signal. The binarization section 82 binarizes a mask signal which is output from the first low-pass filter 81 and where the slant is given to the edge, using a first threshold value. A position of an edge of the original mask signal is moved through the operations of the first low-pass filter 81 and the binarization section 82.

The second low-pass filter 83 in the second stage applies a low-pass filter to the mask signal which is output from the binarization section 82 and where the position of the edge is moved. Thereby, aslant is given to the edge of the mask signal. The clipping section 84 clips the signal which is equal to or less than a second threshold value to 0, in the mask signal which is output from the second low-pass filter 83 and where the slant is given to the edge, using the second threshold value.

Figure 17:
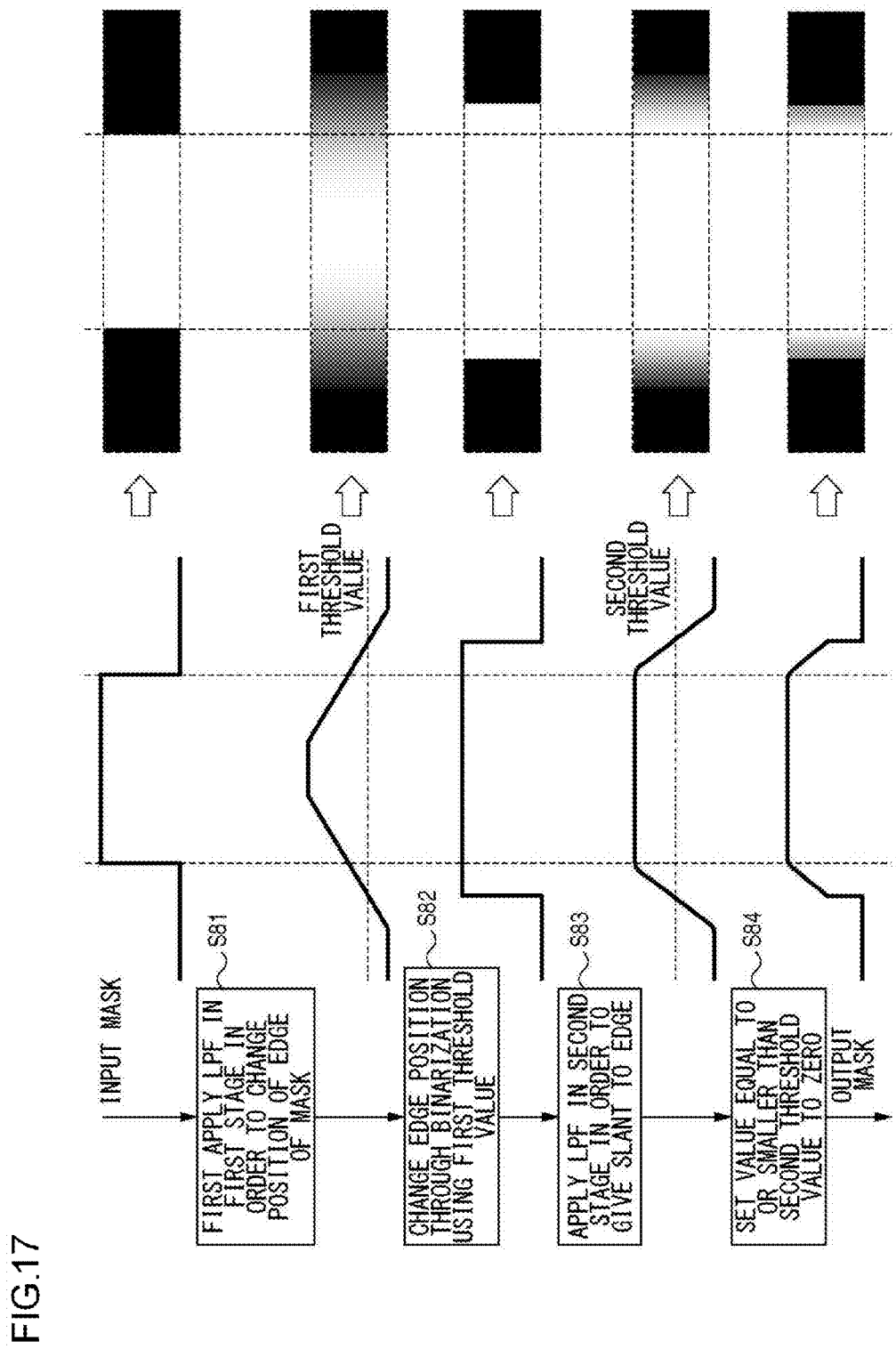
FIG. 17 is a diagram illustrating a mask blurring process performed by the mask correcting unit of FIG. 16.

FIG. 17 is a diagram illustrating a mask blurring process performed by the mask correcting unit 80 of FIG. 16. In FIG. 17, a process flow is illustrated on the left, waveforms of mask signals are illustrated at the center, and mask images are illustrated on the right. In a description of FIG. 17, it is assumed that each pixel value of the mask is defined to 8 bits, black is defined to 0 (0b00000000) and white is defined to 255 (0b11111111) in the mask image. Typically, an original mask signal is a binary signal having only 0 or 255.

The original mask signal is input to the first low-pass filter 81. The first low-pass filter 81 applies a low-pass filter to the original mask signal as a pre-process for changing a position of the edge of the mask signal (S81). Specifically, the first low-pass filter 81 processes the original mask signal into a mask signal where an edge region slants. A value of the slanting part is processed into a value between 0 and 255 (excluding 0 and 255).

Next, the binarization section 82 compares the value of the mask signal which is processed as a pre-process for changing a position of the edge of the mask signal with the first threshold value, thereby binarizing the mask signal (S82). Specifically, if the value of the mask signal is larger than the first threshold value, the value of the mask signal is set to 255, and, if smaller, the value of the mask signal is set to 0. Thereby, the mask signal becomes a binary signal having only 0 or 255 again.

In a case where the first threshold value is set to be smaller than 127 which is an intermediate value between 0 and 255, the edge of the binarized mask signal is moved further outward than the edge of the original mask signal. In this case, the area of white in the mask image is enlarged. On the other hand, in a case where the first threshold value is set to be larger than 127 which is an intermediate value, the edge of the binarized mask signal is moved further inward than the edge of the original mask signal. In this case, the area of white in the mask image is reduced. In addition, in a case where the first threshold value is set to 127 which is an intermediate value, the edge of the binarized mask signal is located at the same position as the edge of the original mask signal.

FIG. 17 illustrates an example in which a position of the edge of the mask signal is moved outward. It is possible to arbitrarily adjust a position of the edge of the mask signal by varying filter characteristics such as the number of taps or coefficients of the first low-pass filter 81 and the first threshold value of the binarization section 82.

Figure 18:
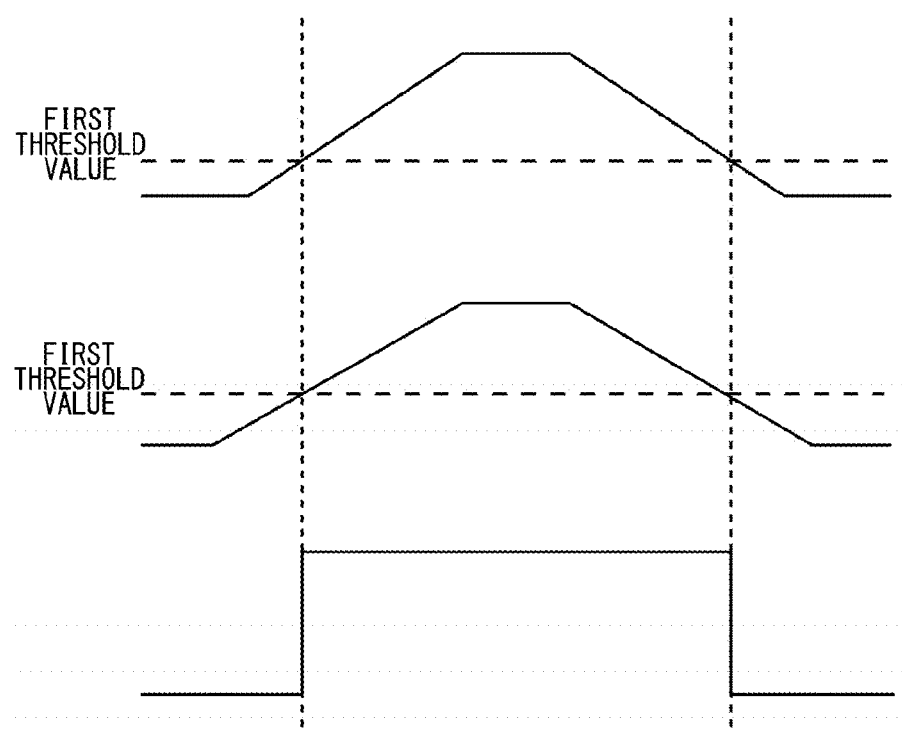
FIG. 18 is a diagram illustrating a relationship between a slant formed in a mask signal by a first low-pass filter and a first threshold value set in a binarization section.

FIG. 18 is a diagram illustrating a relationship between a slant formed in a mask signal by the first low-pass filter 81 and the first threshold value set in the binarization section 82. In a case of generating mask signals having the same edge position, there is a relationship in which, if a slant is gentle and long, the first threshold value increases, and, if a slant is steep and short, the first threshold value decreases. The user inputs the filter characteristics of the first low-pass filter 81 and the first threshold value of the binarization section 82 from the operation unit 60 so as to be set in the first low-pass filter 81 and the binarization section 82 via the operation reception unit 40. The user adjusts at least one of the filter characteristics of the first low-pass filter 81 and the first threshold value of the binarization section 82 from the operation unit 60, thereby arbitrarily adjusting an edge position of the mask signal. In addition, since the first threshold value set to be low enables a slant to be short, the number of taps of the first low-pass filter 81 can be reduced, and thus the first low-pass filter 81 can be simplified.

The description will be continued with reference to FIG. 17 again. The mask signal where the edge position is moved is input to the second low-pass filter 83. The second low-pass filter 83 applies a low-pass filter to the mask signal where the edge position is moved (S83). Thereby, a blurring mask where the edge region slants again is generated.

Next, the clipping section 84 compares a value of the mask signal which is generated by the second low-pass filter 83 and has a slant in the edge region with the second threshold value, and sets the value of the mask signal to 0 when the value of the mask signal is equal to or smaller than the second threshold value (S84). In other words, the slant on the white side is left and the slant on the black side steeply falls in the edge region. Thereby, the slant varying from white to gray can be given in the region larger than the second threshold value, and the black mask can be generated in the region which is equal to or smaller than the second threshold value. Through this clipping process, a blurred region in the mask is limited, and thereby it is possible to suppress the edge region of the mask from increasing more than an intended size.

Although an example in which the blurring process is performed in the horizontal direction is illustrated in FIG. 17, a two-dimensional low-pass filter is used, and thereby the blurring process can be performed in both the horizontal direction and the vertical direction. At this time, a filter in which coefficients are different in the horizontal direction and the vertical direction may be used. In this case, an edge position of a mask signal, an extent of a slant, a blurring width can be adjusted individually in the horizontal direction and the vertical direction.

In addition, an elliptical two-dimensional low-pass filter which has different coefficients in the horizontal direction and the vertical direction and has an intermediate value of the horizontal and vertical coefficients in the slant direction may be used. If the elliptical two-dimensional low-pass filter is used, an edge position of a mask signal, an extent of a slant, and a blurring width can be adjusted individually in the horizontal direction and the vertical direction, and the adjustment can be applied to the slant direction. For example, a square original mask can be processed into a rectangular mask with any length in the horizontal direction and vertical direction and with round corners. In addition, a square original mask can be processed into a rectangular mask, given any gentle slant in all directions, in which extents of horizontal and vertical slants gently vary with continuity with extents of horizontal and vertical slants at corners in an individual and arbitrary manner.

Figure 19:
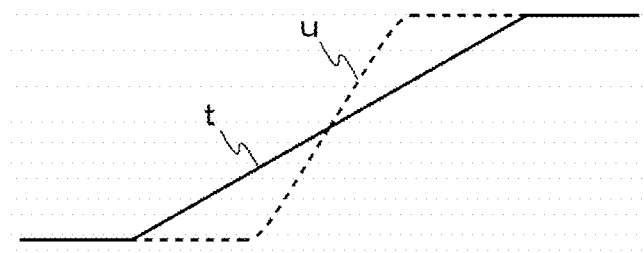
FIG. 19 is a diagram illustrating a comparison between a slant given by the first low-pass filter and a slant given by the second low-pass filter.

FIG. 19 is a diagram illustrating a comparison between a slant given by the first low-pass filter 81 and a slant given by the second low-pass filter 83. The slant given by the first low-pass filter 81 (refer to the reference sign t) is a false slant used to adjust a binarization boundary position, and disappears after the binarization. Therefore, the slant may be a slant which linearly varies at a constant angle. The slant (refer to the reference sign t) given by the second low-pass filter 83 is a remaining slant, and thus the user may also adjust a shape of the slant. For example, the slant may be adjusted to a shape of which an upper part is convex on an upper side of the slant, and a lower part is convex on a lower side thereof. If the adjustment to this shape is performed, a clipped width can be increased.

As such, by adjusting the filter characteristics such as the number of taps or coefficients of the first low-pass filter 81 and the second low-pass filter 83, the first threshold value of the binarization section 82, and the second threshold value of the clipping section 84, it is possible to freely adjust an edge position of a mask signal, the area of a valid region of a mask, and a blurring width. In addition, it is not necessary to perform the same blurring process on mask signals of all layers, and the blurring process may be performed individually for each mask signal of a layer.

Through the above-described blurring process, an edge of a mask signal can be moved to any position, and the area of a valid region of the mask can be varied. In addition, any slant can be given to an edge region. Further, any limitation is imposed on a blurring region of a mask.

The blurring mask is used to combine depth maps in a subsequent stage. The depth map processing unit 20 alpha-blends a plurality of layer depth maps according to a level of the blurring mask. At this time, a combining ratio of the layer depth maps is determined depending on the level of the blurring mask.

As described above, according to Embodiment 1, when the layer depth maps are combined, the blurring mask is used, and thereby continuity can be given to an object boundary part of a combined depth map. In other words, in a case where a great step-difference is in the object boundary part, the step-difference can be reduced. Therefore, an object boundary part of an image of a different viewpoint generated based on the combined depth map can be completed to a natural boundary.

In addition, even in a case where a mask created with an incorrect outline is used for an object of which a boundary is vague, a position of the outline is adjusted, and thereby it is possible to prevent an outline of an object of a generated 3D image from being an awkward outline.

Hereinafter, a description will be made of a method in which awkwardness of an object boundary can be hardly visible without using a blurring mask.

Figure 20:
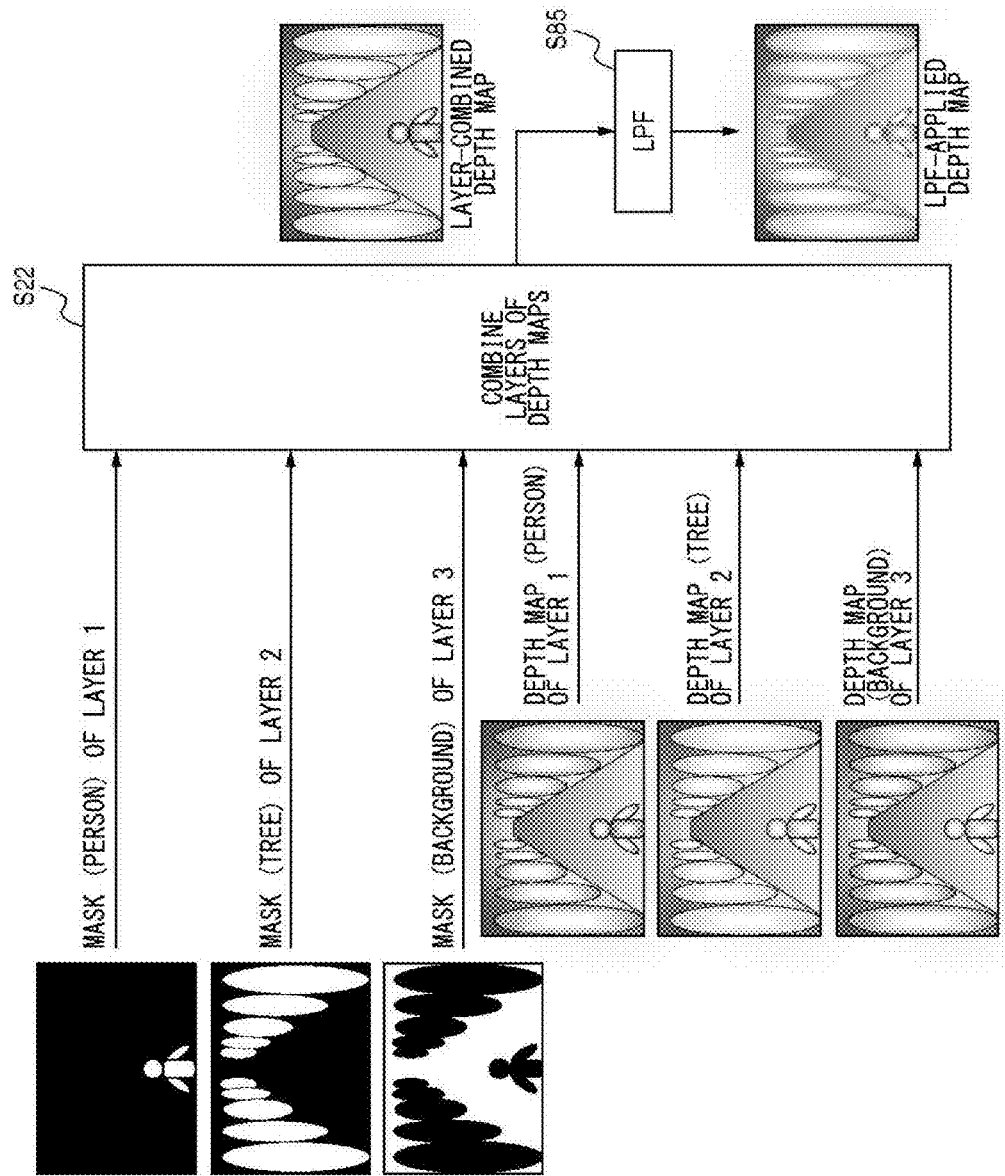
FIG. 20 is a diagram illustrating overall process procedures of an image editing system according to a modified example of Embodiment 1 of the present invention.

FIG. 20 is a diagram illustrating overall process procedures of an image editing system 500 according to a modified example of Embodiment 1 of the present invention. The process procedures of FIG. 20 include a low-pass filtering process added to the process procedures of FIG. 4. Hereinafter, a difference therebetween will be described. The mask blurring process is not added unlike in the process procedures of FIG. 14.

The depth map processing unit 20 applies a low-pass filter to a combined depth map (S85). Thereby, a variation in a depth value of an object boundary in a depth map is smoothened. However, a variation in a depth value cannot be randomly adjusted as compared with the method of using the blurring mask. In addition, in the method of using the blurring mask, only a variation in a depth value of the object boundary can be processed so as to be smoothened. In contrast, in the method of applying a low-pass filter to a combined depth map, fine details (unevenness) disappear in a flat part inside an object as well as in the object boundary.

The method of using the blurring mask and the process of applying a low-pass filter to a combined depth map may be used independently, or both of them may be used together. In addition, an order of the processes may be changed. A low-pass filter may be applied to depth maps before layer combination so as to generate layer depth maps having undergone the blurring process, the layer depth maps may be combined using the blurring mask, and the low-pass filter may be further applied to the combined depth map.

Next, Embodiment 2 will be described. In Embodiment 1, the method in which an object boundary is blurred and thereby awkwardness of the object boundary can be hardly visible has been described. In Embodiment 2, a description will be made of a method in which pixels of an awkward location in an object boundary are corrected through a manual painting process by a user. This painting process includes the following three procedures. First, pixels of an awkward location are specified. Next, the pixels of the awkward location are removed. Finally, pixels of the removed location are reconfigured through painting.

In the above-described procedures, in a case where pixel interpolation is performed together with pixel shift, it is difficult to specify an awkward location. In addition, even in a case where pixel interpolation is not performed, a state in which shifted pixels are sparsely present around an omitted pixel may occur. In this case, it is necessary to redraw pixels again through painting after the shifted pixels which are sparsely present are removed. These are the causes for the increase in the number of procedures for the painting work.

Figure 21:
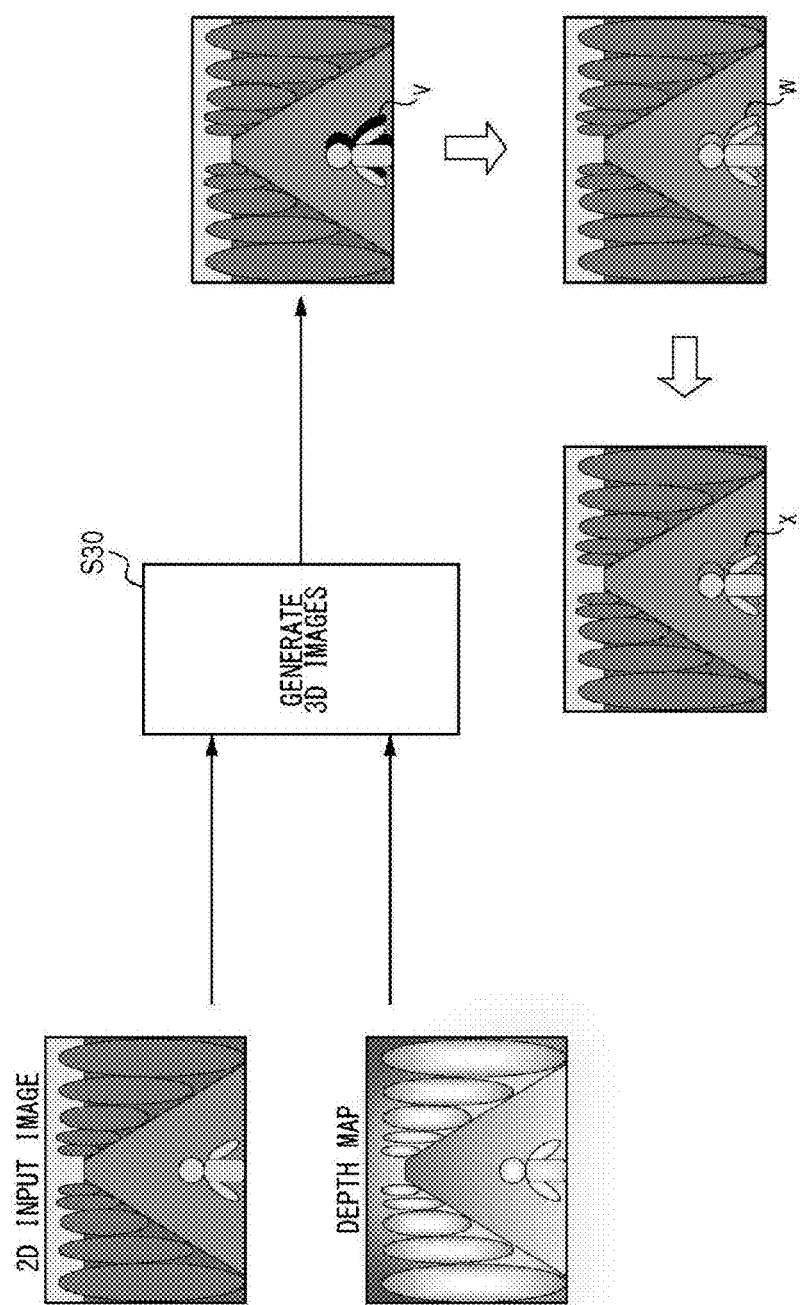
FIG. 21 is a diagram illustrating a filling-off functions by an image editing system according to Embodiment 2 of the present invention.

FIG. 21 is a diagram illustrating filling-off functions by an image editing system 500 according to Embodiment 2 of the present invention. The filling-off functions include the following three functions. A wide omitted pixel region occurs when a pixel shift amount is large. The first function is a function in which pixel interpolation stops when a pixel shift amount is large, and thereby omitted pixels are intentionally left. The second function is a function in which a state where omitted pixels are generated not sparsely but in a lump occurs. Specifically, a pixel shift amount of not only a target pixel but also a peripheral pixel is monitored, and pixel interpolation stops when a pixel shift amount of any pixel including the peripheral pixel is large. The third function is a function in which an omitted pixel region is easily visible to a user by burying a pixel of a specific color instead of interpolating an occurring omitted pixel.

In FIG. 21, in the same manner as in FIGS. 11 and 12, the area of an omitted pixel region caused by shifting pixels is larger than the area in FIG. 10 (refer to the reference sign v). In FIG. 21, omitted pixels are generated in a lump, and a pixel of a specific color is buried in the omitted pixel region (refer to the reference sign w). The user draws and corrects an omitted pixel region of the specific color through a painting work (refer to the reference sign x).

Figure 22:
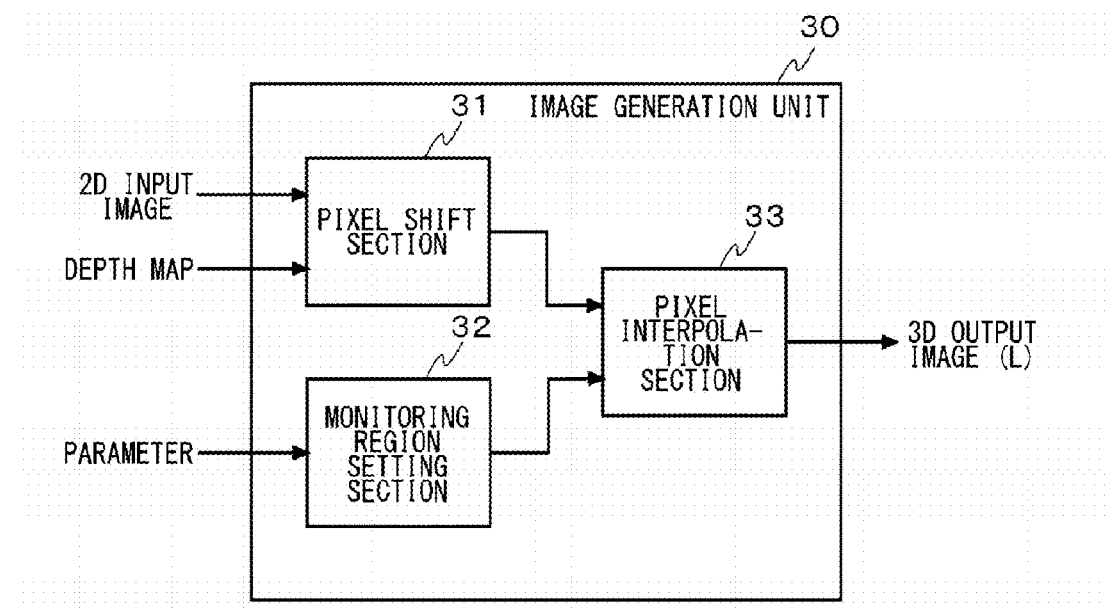
FIG. 22 is a diagram illustrating a configuration of a 3D image generation unit according to Embodiment 2 of the present invention.

FIG. 22 is a diagram illustrating a configuration of a 3D image generation unit 30 according to Embodiment 2 of the present invention. The 3D image generation unit 30 according to Embodiment 2 includes a pixel shift section 31, a monitoring region setting section 32, and a pixel interpolation section 33. This configuration can also be realized in various forms by only hardware, only software, or a combination thereof.

The pixel shift section 31 shifts pixels of a 2D input image on the basis of a depth map processed by the depth map processing unit 20. The pixel interpolation section 33 interpolates omitted pixels caused by the pixel shift performed by the pixel shift section 31. Fundamentally, the omitted pixels are interpolated by peripheral pixels. When the omitted pixels are interpolated, the pixel interpolation section 33 skips interpolation of a pixel in which a variation amount (hereinafter, referred to as a derivative of a depth) of depth values with an adjacent pixel is larger than a set value. The set value can be adjusted by a user from the operation unit 60, and the sensitivity of the interpolation skipping process can be adjusted by adjusting the set value.

In a case where at least one pixel in which a derivative of a depth is larger than the set value of a target pixel and a peripheral pixel, the pixel interpolation section 33 omits the target pixel. Interpolation of the omitted pixel is skipped. The monitoring region setting section 32 sets a monitoring region defined by the target pixel and the peripheral pixel. The area and/or the shape of the monitoring region may be fixed or varied.

The monitoring region setting section 32 may set the monitoring region according to an externally set parameter. The parameter can be adjusted by the user from the operation unit 60. For example, a monitoring region, regulated by five parameters including the number of upward pixels, the number of downward pixels, the number of leftward pixels, the number of rightward pixels, and an expansion rate, with respect to a target pixel, may be set. Therefore, a monitoring region which is horizontally asymmetrical with respect to the target pixel may be set. For example, the monitoring region setting section 32 may set a monitoring region in which the area of a right side of the target pixel is larger than that of a left side in a case where a 2D input image is shifted to the left by the pixel shift section 31, and, the monitoring region setting section 32 may set a monitoring region in which the area of a left side of the target pixel is larger than that of a right side in a case where a 2D input image is shifted to the right.

The pixel interpolation section 33 may bury a pixel of a specific color in an omitted pixel instead of being interpolated by a peripheral pixel. For example, a pixel of a color such as red which is easily visible may be buried.

Hereinafter, the above-described three functions will be described in detail using specific examples. First, the first function will be described. As described above, when a pixel shift amount is large, a variation amount in a depth value which is used as a reference of the pixel shift amount also increases. In a case where a derivative of a depth is larger than a set value, it is determined that awkwardness of an object boundary becomes remarkable due to pixel interpolation, and the pixel interpolation stops. The derivative of a depth is obtained by subtracting a depth value of a pixel shifted by one pixel in the horizontal direction from a depth value of a target pixel.

When another image is generated by shifting pixels of an input image to the left, awkwardness of an object boundary occurs on the right side of the shifted pixels. Therefore, in this case, preferably, a variation in a depth of the target pixel is monitored only on the right side so as not to influence the left side of the target pixel. Similarly, when another image is generated by shifting pixels of the input image to the right, preferably, a variation in a depth of the target pixel is monitored only on the left side so as not to influence the right side of the target pixel.

Next, the second function will be described. In order to generate omitted pixels in a lump, a derivative of a depth corresponding to a pixel shift amount is monitored with respect to not only a target pixel but also a peripheral pixel. The wider the peripheral monitoring region, the larger the area of omitted pixels generated in a lump; however, if the peripheral monitoring region is too wide, a pixel which is normally shifted and is not required to be corrected is also omitted. Therefore, it is necessary to set an appropriate monitoring region.

Figure 23E:
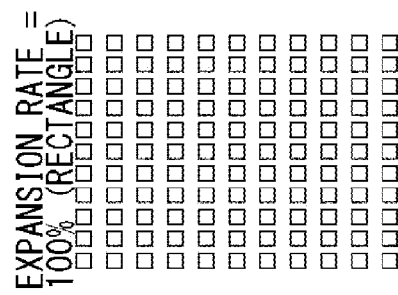
FIGS. 23A to 23E are diagrams illustrating a plurality of examples of the monitoring region.
Figure 23D:
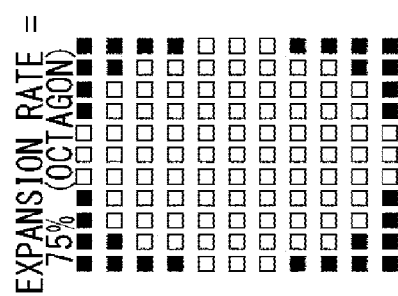
Figure 23C:
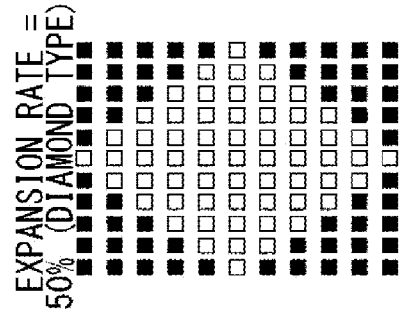
Figure 23B:
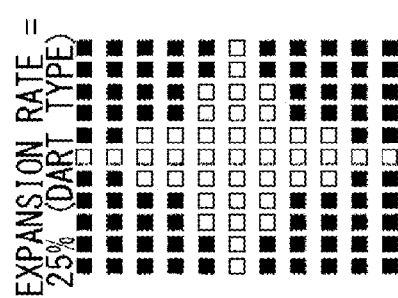
Figure 23A:
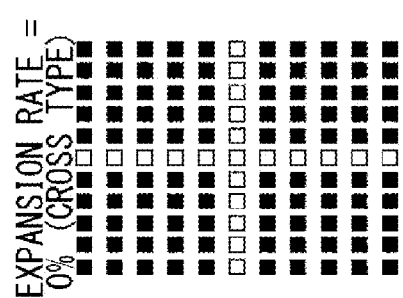

FIGS. 23A to 23E illustrate a plurality of examples of the monitoring region. FIG. 23A illustrates a cross type monitoring region, FIG. 23B illustrates a dart type monitoring region, FIG. 23C illustrates a diamond type monitoring region, FIG. 23D illustrates an octagonal monitoring region, and FIG. 23E illustrates a rectangular monitoring region. These shapes can be set using an expansion rate. The cross type is generated by setting the expansion rate to 0%, the dart type is generated by setting the expansion rate to 25%, the diamond type is generated by setting the expansion rate to 50%, the octagonal type is generated by setting the expansion rate to 75%, and the rectangular type is generated by setting the expansion rate to 100%.

In this example, the expansion rate is defined by a relationship between a cross line and a rectangle inscribed in the cross line. Specifically, when the length of a line segment connecting the center of the rectangle to the vertex thereof is set to 100%, the expansion rate is defined by a ratio of expansion and contraction of the line segment. In other words, the monitoring region is formed by connecting four end points of the cross line to four end points of expanded or contracted line segments. If the expansion rate is 0%, there is no line segment, and thus a monitoring region is formed by connecting four end points of the cross line. Monitoring regions which shapes are different from the cross type to the rectangular type can be freely set, and thereby it is possible to generate a lump of omitted pixels with a shape according to a user's intention.

Hereinafter, a method of setting a monitoring region using five setting parameters will be described using detailed examples. The five setting parameters which are used are the number of upward pixels, the number of downward pixels, the number of leftward pixels, the number of rightward pixels, and the expansion rate. The expansion rate is an expansion rate described in FIGS. 23A to 23E.

Figure 24:
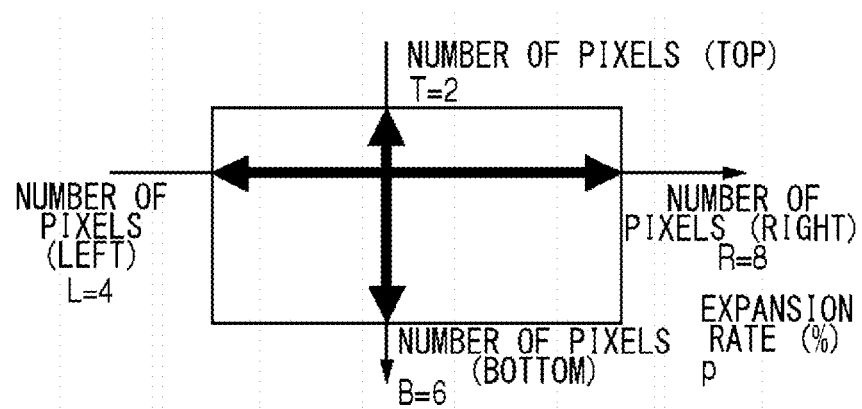
FIG. 24 is a diagram illustrating a detailed example of the monitoring region generated by five setting parameters (the first)

FIG. 24 is a diagram illustrating a detailed example of the monitoring region generated by the five setting parameters (the first). In this detailed example, the number T of upward pixels is set to 2, the number B of downward pixels is set to 6, the number L of leftward pixels is set to 4, and the number R of rightward pixels is set to 8.

Figure 25:
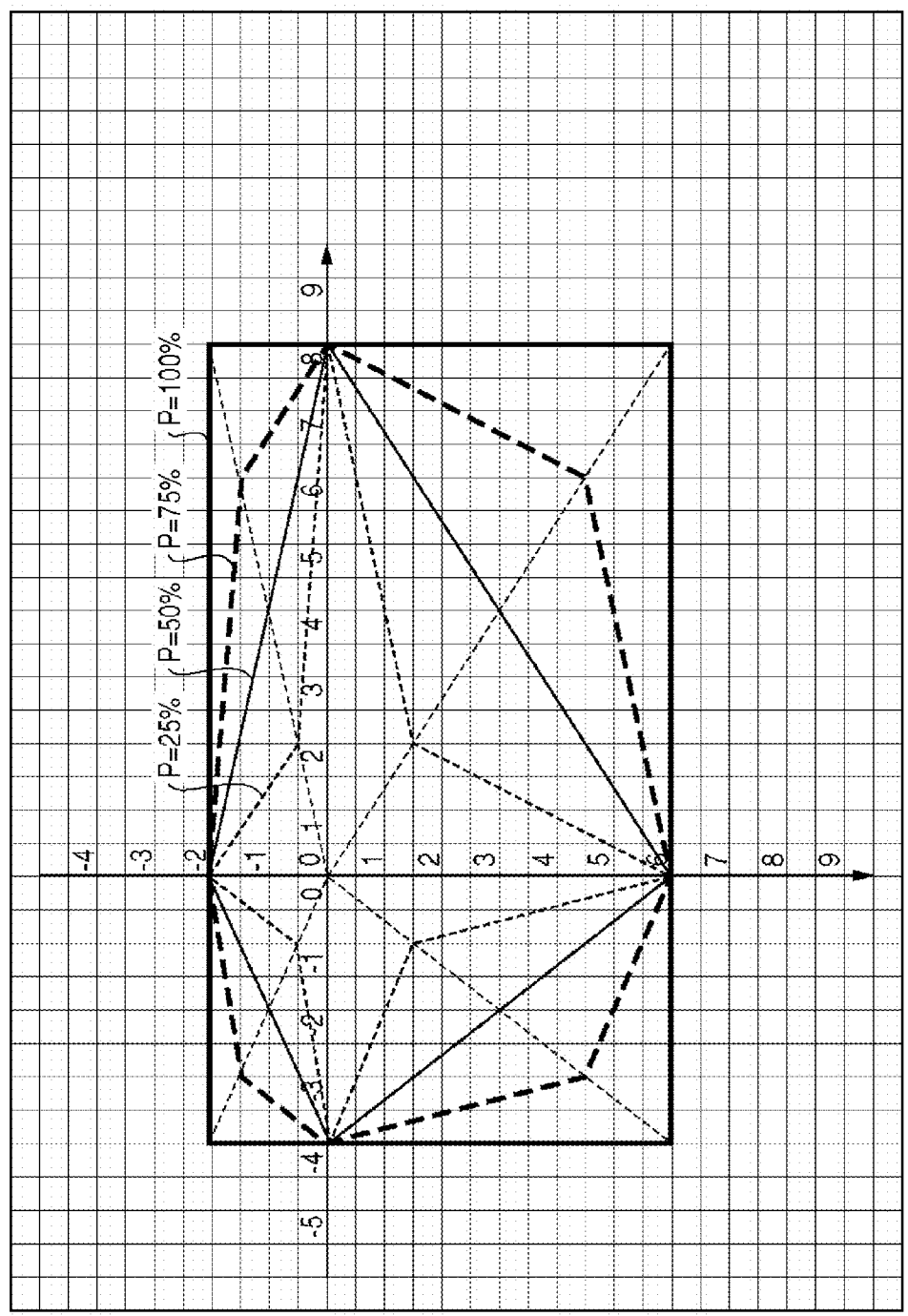
FIG. 25 is a diagram illustrating a detailed example of the monitoring region generated by five setting parameters (the second)

FIG. 25 is a diagram illustrating a detailed example of the monitoring region generated by the five setting parameters (the second). The graph of FIG. 25 illustrates monitoring regions in cases where the expansion rate P is 25%, the expansion rate P is 50%, the expansion rate P is 75%, and the expansion rate P is 100%, on the premise of the set values of FIG. 24. As described above, the five setting parameters can be freely set independently, and thereby a monitoring region with a shape which is vertically and horizontally asymmetrical can be randomly set.

Figure 26:
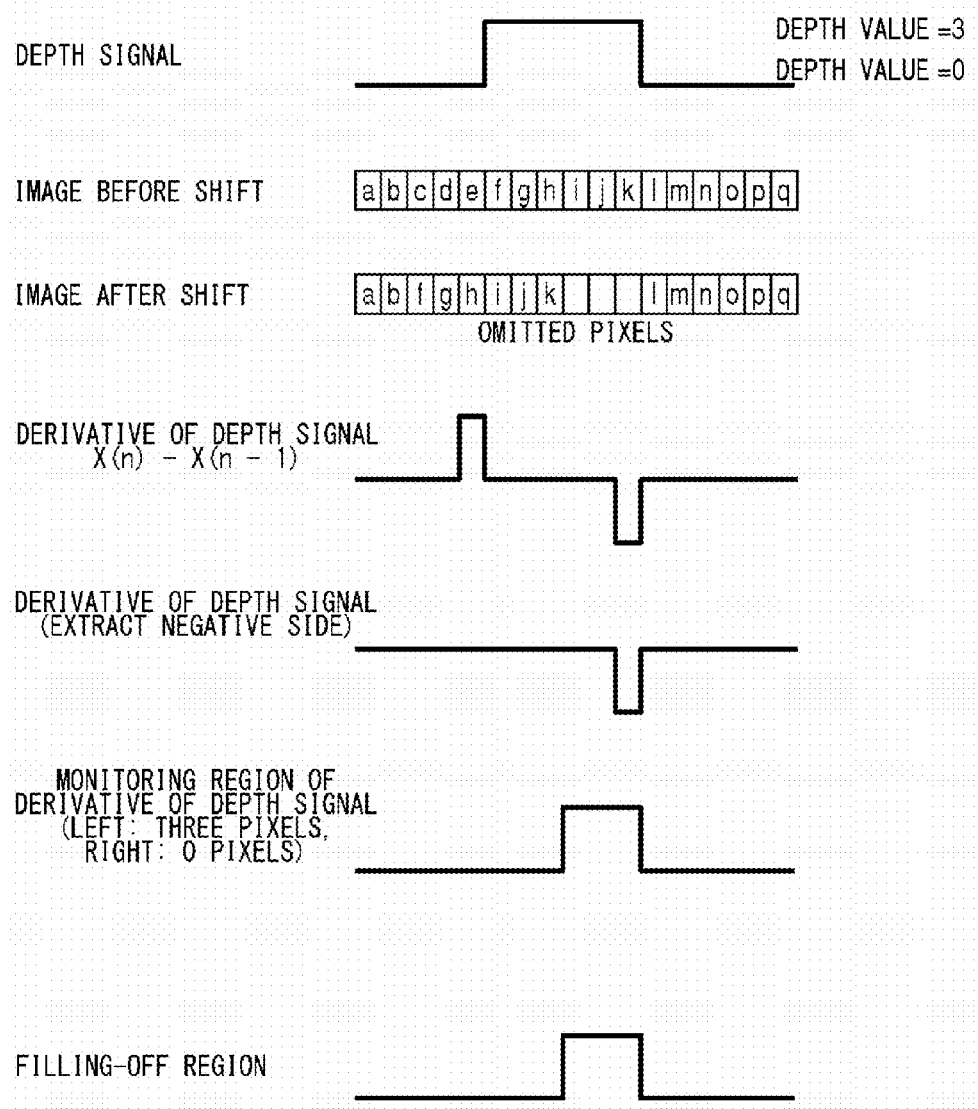
FIG. 26 is a diagram illustrating monitoring and filling-off a derivative of a depth signal (right eye image)

FIG. 26 is a diagram illustrating monitoring of a derivative of a depth signal and filling-off (right eye image). A right eye image is generated by shifting pixels of an input image to the left. The pixel shift section 31 shifts the pixels of the input image on the basis of a depth signal. In FIG. 26, the pixels f to k are shifted to the left by three pixels. As a result of the shift, an omitted pixel region of three pixels occurs on the right side of the pixels f to k.

The pixel interpolation section 33 generates a derivative of the depth signal in order to determine whether or not to perform filling-off. In a case where the pixels are shifted to the left, a difference between a depth value of a target pixel and a depth value of a pixel adjacent thereto to the left is set as a derivative $(X(n)-X(n-1))$. The omitted pixels occur on the right of the shifted pixels, thus a negative side of the derivative of the depth signal is extracted, and thereby specifying positions of the omitted pixels. In a case where the derivative of the depth signal of which the negative side is extracted exceeds a set value, the pixel interpolation section 33 fills off the pixel. The filled-off pixel is only a pixel located at the right end of the omitted pixel region, and thus two pixels on the left thereof are not filled off in principle.

In FIG. 26, a monitoring region of the derivative of the depth signal is enlarged by three pixels to the left and by 0 pixels to the right. Therefore, the pixel interpolation section 33 monitors derivatives of the depth signal of a total of three pixels including the target pixel and two pixels adjacent thereto to the left. In a case where any one of the derivatives of the depth signal of the three pixels exceeds the set value, the pixel interpolation section 33 fills off the target pixel. Thereby, an appropriately filling-off region as illustrated in the lowermost part of FIG. 26 can be obtained. Therefore, the omitted pixel region can be appropriately filled off. Further, since the monitoring region is enlarged to the right by 0 pixels, a region which is not required to be filled off is set not to be filled off.

Figure 27:
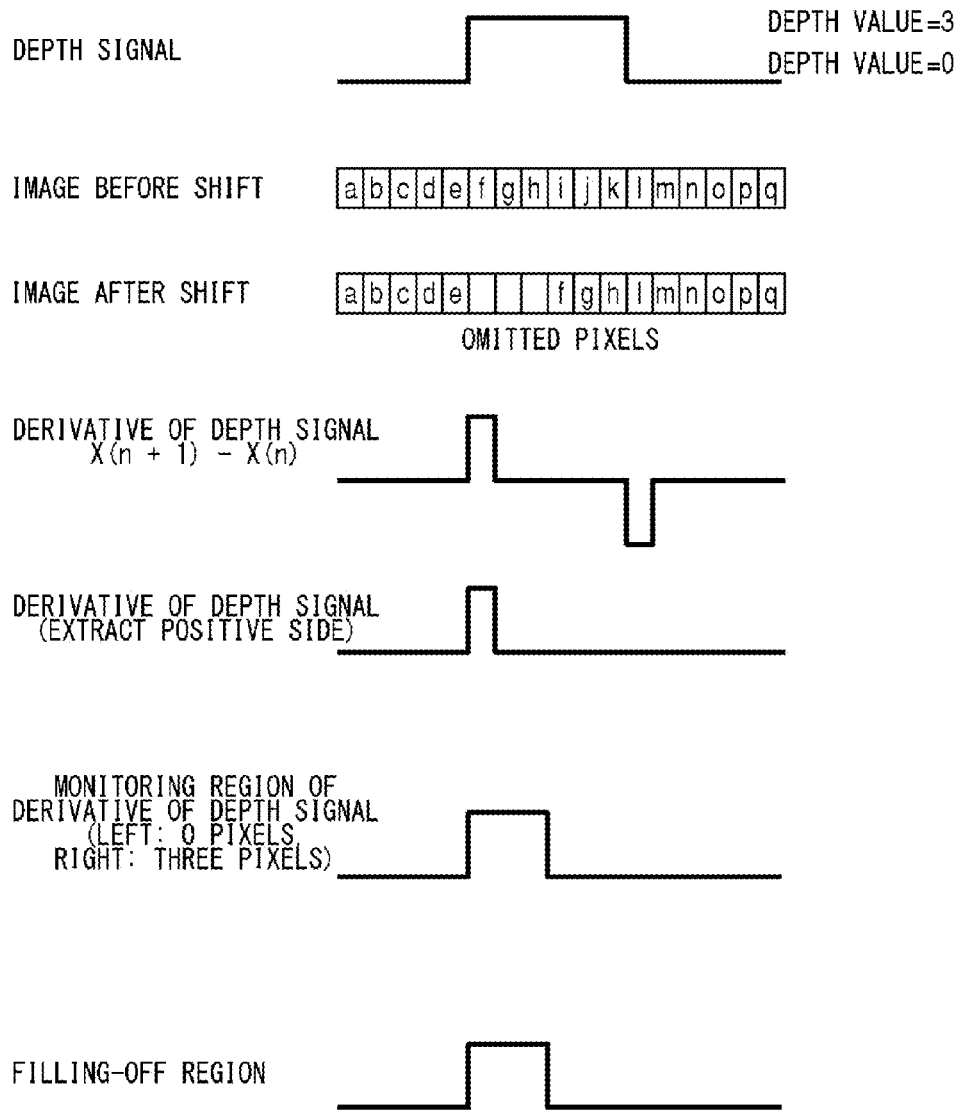
FIG. 27 is a diagram illustrating monitoring and filling-off a derivative of a depth signal (left eye image)

FIG. 27 is a diagram illustrating monitoring of a derivative of a depth signal and filling-off (left eye image). A left eye image is generated by shifting pixels of an input image to the right. The pixel shift section 31 shifts the pixels of the input image on the basis of a depth signal. In FIG. 27, the pixels f to h are shifted to the right by three pixels. As a result of the shift, an omitted pixel region of three pixels occurs on the left side of the pixels f to h.

The pixel interpolation section 33 generates a derivative of the depth signal in order to determine whether or not to perform filling-off. In a case where the pixels are shifted to the right, a difference between a depth value of a target pixel and a depth value of a pixel adjacent thereto to the right is set as a derivative ($X(n+1)-X(n)$). The omitted pixels occur on the left of the shifted pixels, thus a positive side of the derivative of the depth signal is extracted, and thereby specifying positions of the omitted pixels. In a case where the derivative of the depth signal of which the positive side is extracted exceeds a set value, the pixel interpolation section 33 fills off the pixel. The filled-off pixel is only a pixel located at the left end of the omitted pixel region, and thus two pixels on the right thereof are not filled off in principle.

In FIG. 27, a monitoring region of the derivative of the depth signal is enlarged by three pixels to the right and by 0 pixels to the left. Therefore, the pixel interpolation section 33 monitors derivatives of the depth signal of a total of three pixels including the target pixel and two pixels adjacent thereto to the right. In a case where any one of the derivatives of the depth signal of the three pixels exceeds the set value, the pixel interpolation section 33 fills off the target pixel. Thereby, an appropriately filling-off region as illustrated in the lowermost part of FIG. 27 can be obtained. Therefore, the omitted pixel region can be appropriately filled off. Further, since the monitoring region is enlarged to the left by 0 pixels, a region which is not required to be filled off is set not to be filled off.

As above, the function of setting a monitoring region to be horizontally asymmetrical is provided, and thereby an omitted pixel region caused by pixel shift can be appropriately specified according to the characteristics and directions of the pixel shift. In addition, the specified omitted pixel region can be appropriately filled off.

Next, the third function will be described. The pixel interpolation section 33 writes a pixel of red or the like different from a peripheral pixel in an omitted pixel which is not interpolated through filling-off. Thereby, a position of the omitted pixel is easily specified. A written pixel is not limited to red pixel and may be pixels of other colors. For example, a pixel of any color different from a color present in an original image is written, and thereby a position of an omitted pixel can be easily recognized. In addition, if a color of a written pixel is black or white, a work for removing the pixel can be omitted when a painting work is performed. A pixel value of a written pixel can be designed so as to be randomly changed, and thereby any color of a written pixel can be selected according to a purpose.

As described above, according to Embodiment 2, the function of skipping pixel interpolation for an omitted pixel caused by a pixel shift is provided, and thereby it is possible to prevent an object boundary from being awkward due to the pixel interpolation. In addition, not only a derivative of a depth of a target pixel but also a derivative of a depth of a peripheral pixel of the target pixel is monitored, and thereby it is possible to prevent omitted pixels from occurring sparsely. When a user performs a painting work, a pixel which is not omitted around omitted pixels is required to be removed; however, the omitted pixels are made to be generated in blocks, and thereby it is possible to simplify the painting work. In addition, a pixel of a specific color is buried in an omitted pixel which does not undergo pixel interpolation, and thereby a user can easily recognize an omitted pixel region which is required to be edited through a painting work.

The image editing system 500 according to Embodiment 1 or Embodiment 2 described above is used independently, or the image editing system 500 related to a combination of Embodiment 1 and Embodiment 2 is used, and thereby it is possible to improve image quality of an object boundary part when 3D images are generated from a 2D image.

Next, Embodiment 3 will be described. In Embodiment 1, the following processes are performed on a mask which is used as a reference when a depth map is processed. The area of a valid region of the mask is varied. A slant is given to an edge part of the mask (specifically, 0 or 1 is not made but an intermediate value such as 0.5 is made). Depth maps are combined through a-blending according to the slant (the intermediate value) given to the mask. A low-pass filter is applied to the combined depth map so as to suppress a rapid variation.

In Embodiment 1, a description has been made of a case where an object boundary part of the combined depth map has continuity through these processes, and awkwardness of the object boundary part of an image (a 3D image) generated based on the combined depth map is not visible.

In the method according to Embodiment 1, a filtering operation is required to be performed on a mask in order to perform the processes of varying the area of a valid region of the mask and giving a slant to an edge part of the mask. That is to say, as described above, the following two filters are used to process the edge of the mask. There is a use of a filter for varying the area of a valid region of a mask by moving an edge position of the mask, and a filter for giving a slant to the mask edge in order to control a blending ratio of depth maps corresponding to the mask.

However, in relation to the filtering operation, a product-sum operation is required to be performed on a single pixel by the number corresponding to the number of taps of the filters. If the number of taps of the filters is large, an operation amount for the process also increases.

In addition, in a case where a filtering process is performed in both of the horizontal direction and the vertical direction using a two-dimensional filter, an operation amount increases in proportion to the area of the filter. For example, if the number of taps is n, the number of product-sum operations is n when a one-dimensional filtering process is performed in either the horizontal direction or the vertical direction. In contrast, in a case where a two-dimensional filtering process is performed in both of the horizontal direction and the vertical direction, if a shape of the filter is assumed to be circular, the number of product-sum operations is $\pi/4 * n^2$. In other words, the number of product-sum operations of the two-dimensional filtering process increases in proportion to the square of the number n of taps of the filter. The large operation amount causes an increase in a process time.

Embodiment 3 is aimed at performing a filtering operation for achieving an aim equivalent to Embodiment 1 at an operation amount smaller than in the method of Embodiment 1. An increase in the operation amount is suppressed so as to reduce a process time.

An object boundary part of the combined depth map has continuity through these processes, and awkwardness of the object boundary part of an image (a 3D image) generated based on the combined depth map is not visible, in Embodiment 3 as well. For this, a process of moving an edge or giving a slant to the edge is performed on a mask which is used as a reference when a depth map is processed. At this time, a filtering operation forming a part of the process is performed at an operation amount smaller than in the method of Embodiment 1 so as to suppress the operation amount from increasing, thereby reducing a process time.

Specifically, a filtering operation process on either a valid region or an invalid region of a mask before a filtering process is performed is skipped in the filtering operation procedure. Details thereof will be described later, and an effect equivalent to the process in Embodiment 1 can be achieved even if the filtering operation process on either the valid region or the invalid region of the mask is skipped. In addition, the filtering operation is not required to be performed on all pixels of the mask, and thus an operation amount is suppressed from increasing so as to reduce a process time.

Figure 28:
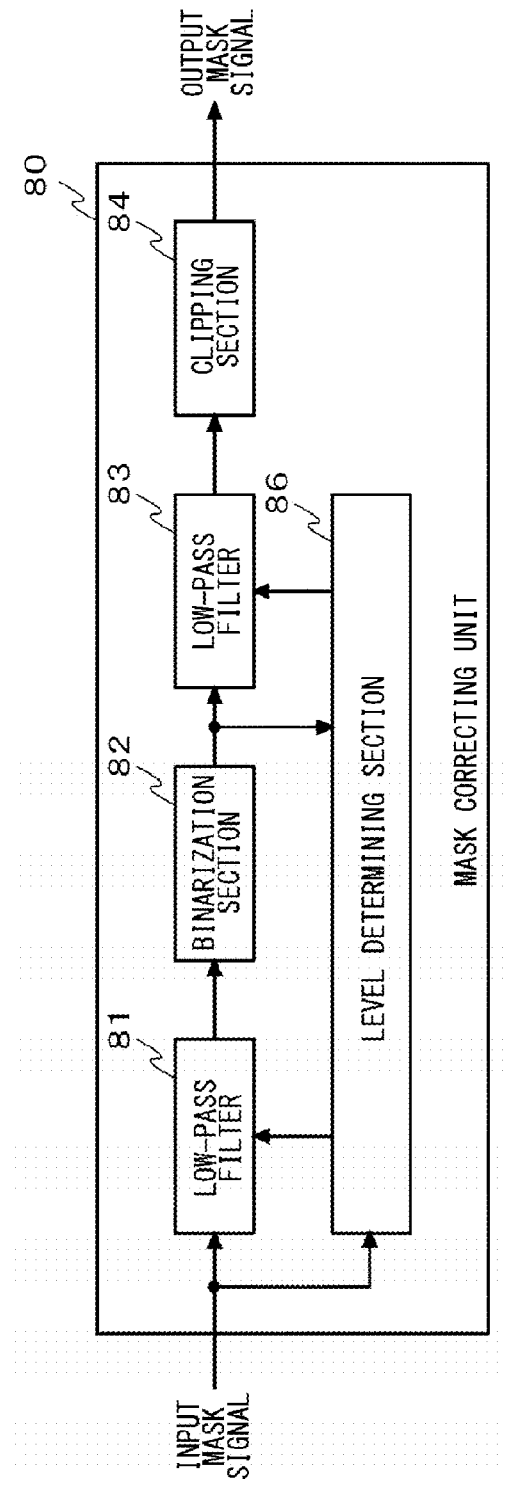
FIG. 28 is a diagram illustrating a configuration example of the mask correcting unit according to Embodiment 3.

FIG. 28 is a diagram illustrating a configuration example of the mask correcting unit 80 according to Embodiment 3. The mask correcting unit 80 according to Embodiment 3 has a configuration in which a first level determining section 86 and a second level determining section 87 are added to the mask correcting unit 80 of FIG. 16. Hereinafter, a difference from the mask correcting unit 80 of FIG. 16 will be described.

The first level determining section 86 determines a level of a mask signal input to the first low-pass filter 81, and limits a target region of the filtering process in the mask signal, performed by the first low-pass filter 81, according to the determination result. The second level determining section 87 determines a level of a mask signal input to the second low-pass filter 83, and limits a target region of the filtering process in the mask signal, performed by the second low-pass filter 83, according to the determination result. Hereinafter, a detailed description thereof will be made.

Figure 29:
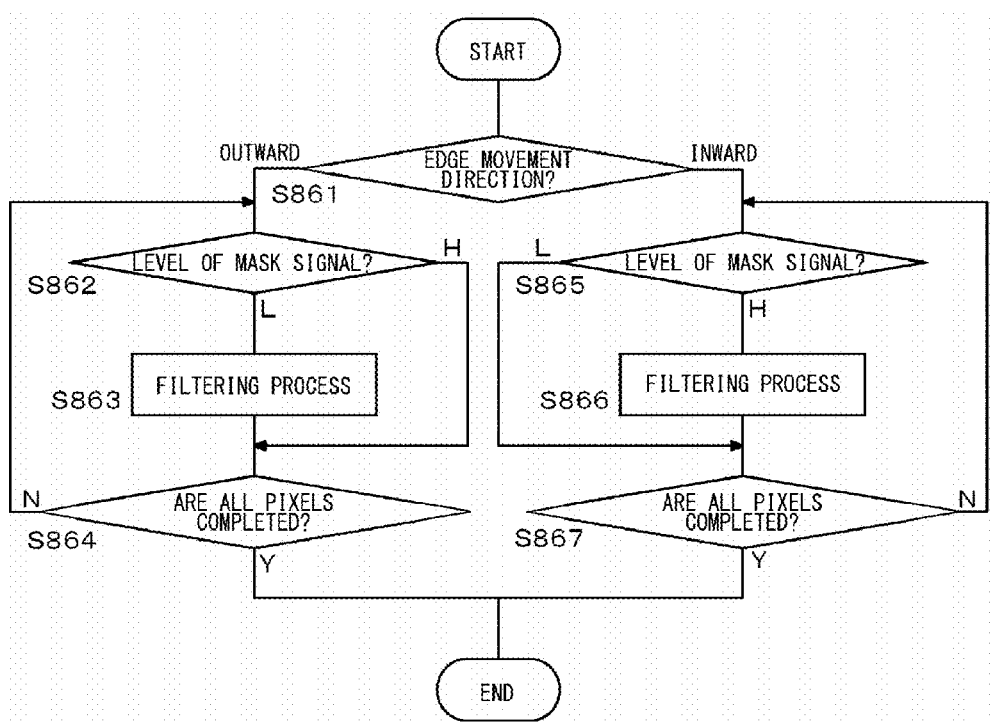
FIG. 29 is a flowchart illustrating a process of limiting a filtering target region of a first low-pass filter with a first level determining section according to Embodiment 3.

FIG. 29 is a flowchart illustrating a process of limiting a filtering target region of the first low-pass filter 81 with the first level determining section 86 according to Embodiment 3. The first level determining section 86 specifies whether or not a movement direction of a mask edge is outward or inward (S861). If a position of the mask edge is moved outward, a valid region of a mask signal is widened, and if a position of the mask edge is moved inward, the valid region of the mask signal is narrowed.

In a case where the mask edge is moved outward (outward in S861), the first level determining section 86 determines a pixel level of the mask signal input to the first low-pass filter 81 (S862). If the pixel level is a low level (corresponding to an invalid pixel in the present embodiment) (L in S862), the first low-pass filter 81 performs a filtering process on the pixel (S863). If the pixel level is a high level (corresponding to a valid pixel in the present embodiment) (H in S862), a filtering process on the pixel is skipped. The processes in steps S862 and S863 are repeatedly performed (N in S864) until the processes for all pixels of the mask signal are completed (Y in S864). In a case where the valid region of the mask signal is widened in this way, the first level determining section 86 skips the filtering process on the valid region of the mask signal, performed by the first low-pass filter 81.

If a position of the mask edge is moved inward (inward in S861), the first level determining section 86 determines a pixel level of the mask signal input to the first low-pass filter 81 (S865). If the pixel level is a high level (H in S865), the first low-pass filter 81 performs a filtering process on the pixel (S866). If the pixel level is a low level (L in S865), a filtering process on the pixel is skipped. The processes in steps S865 and S866 are repeatedly performed (N in S867) until the processes for all pixels of the mask signal are completed (Y in S867). In a case where the valid region of the mask signal is narrowed in this way, the first level determining section 86 skips the filtering process on the invalid region of the mask signal, performed by the first low-pass filter 81.

Figure 30:
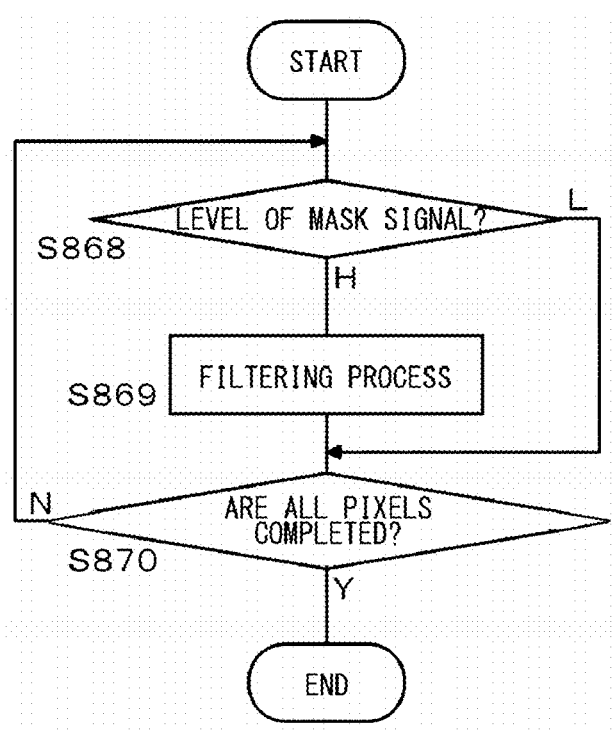
FIG. 30 is a flowchart illustrating a process of limiting a filtering target region of a second low-pass filter with a second level determining section according to Embodiment 3.

FIG. 30 is a flowchart illustrating a process of limiting a filtering target region of the second low-pass filter 83 with the second level determining section 87 according to Embodiment 3. The second level determining section 87 determines a pixel level of the mask signal where a position of the edge is moved through binarization performed by the binarization section 82 and which is input to the second low-pass filter 83 (S868). If the pixel level is a high level (H in S868), the second low-pass filter 83 performs a filtering process on the pixel (S869). If the pixel level is a low level (L in S868), a filtering process on the pixel is skipped. The processes in steps S868 and S869 are repeatedly performed (N in S870) until the processes for all pixels of the mask signal are completed (Y in S870). In a case where a slant is given to the edge of the mask signal in this way, the second level determining section 87 skips the filtering process on an invalid region of the mask signal, performed by the second low-pass filter 83. Hereinafter, a description will be made in detail using specified examples.

First, a description will be made of a process performed by the first low-pass filter 81 which is used to vary the area of a valid region by moving an edge position of the mask. Initially, a description will be made of a case of increasing a mask edge width using the first low-pass filter 81.

Figure 31A:
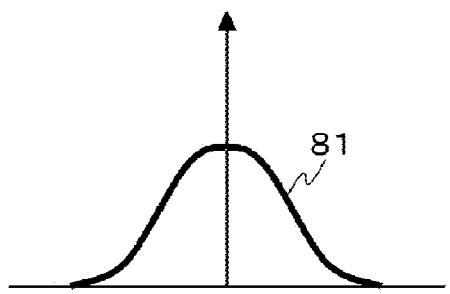
FIGS. 31A to 31C are diagrams illustrating a process of performing a filtering operation on all pixels so as to increase a mask edge width.
Figure 31B:
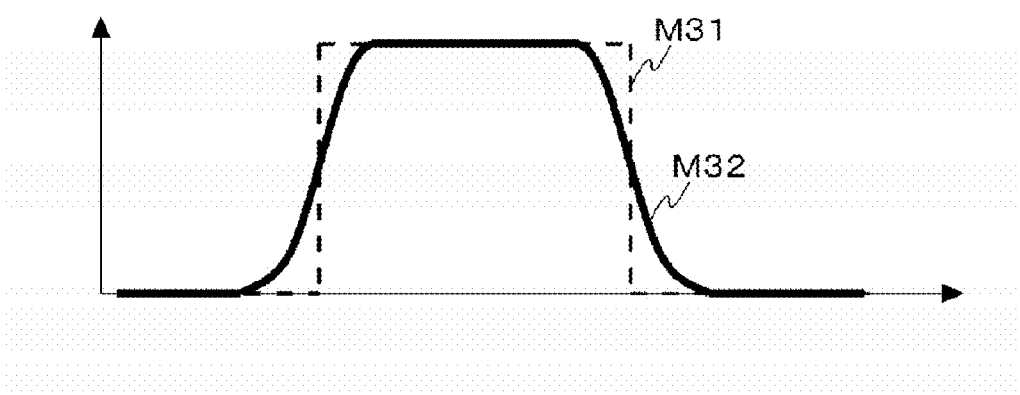
Figure 31C:
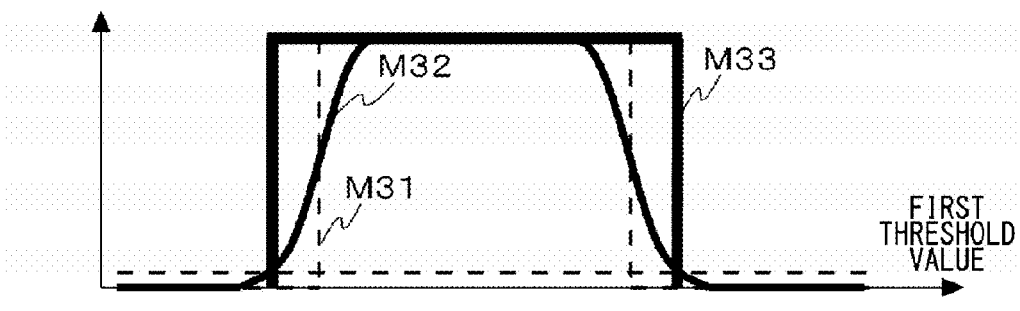
Figure 32A:
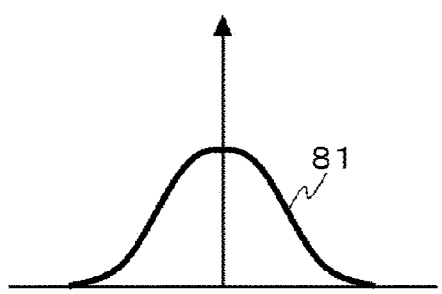
FIGS. 32A to 32C are diagrams illustrating a process of performing a filtering operation on only invalid pixels of a mask so as to increase a mask edge width.
Figure 32B:
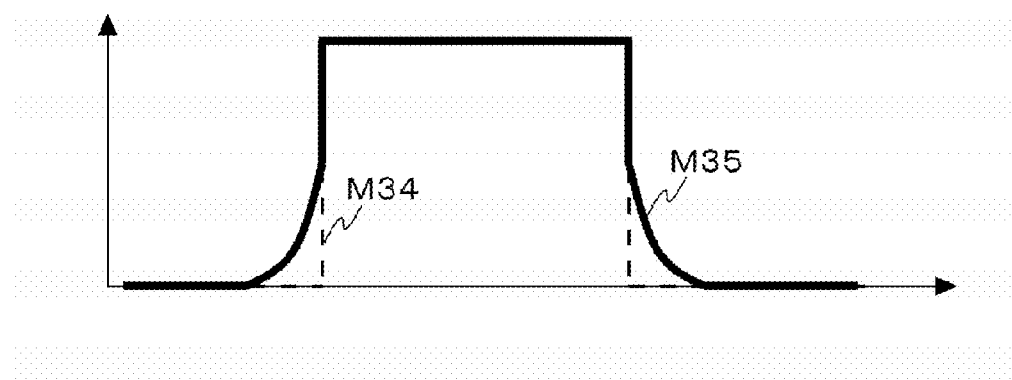
Figure 32C:
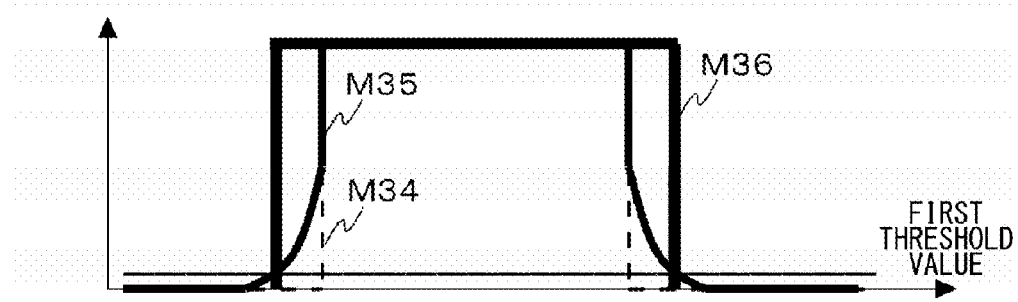

FIGS. 31A to 31C are diagrams illustrating a process of performing a filtering operation on all pixels so as to increase a mask edge width. FIGS. 32A to 32C are diagrams illustrating a process of performing a filtering operation on only invalid pixels of a mask so as to increase a mask edge width. The first low-pass filter 81 illustrated in FIG. 31A has the same shape as the first low-pass filter 81 illustrated in FIG. 32A.

FIG. 31B illustrates a result in which a filtering operation is performed on all pixels of a mask M31 (the dotted line) which is a filtering target using the first low-pass filter 81 illustrated in FIG. 31A. FIG. 32B illustrates a result in which a filtering operation is performed on invalid pixels of a mask M34 (the dotted line) which is a filtering target using the first low-pass filter 81 illustrated in FIG. 32A. As a result of the filtering operation, only the parts which have undergone the filtering operation are given a slant in a mask M32 (the solid line) and a mask M35 (the solid line), and the parts which have not undergone the filtering operation maintain a mask waveform before the filtering operation. In FIG. 31B, in the filtered mask M32 (the solid line), slants are given to the inside and the outside of the mask edge; however, in FIG. 32B, in the filtered mask M35 (the solid line), a slant is given to the outside of the mask edge, and a slant is not given to the inside thereof.

FIG. 31C illustrates a result in which the filtered mask M32 (the solid line) illustrated in FIG. 31B is binarized using a first threshold value. FIG. 32C illustrates a result in which the filtered mask M35 (the solid line) illustrated in FIG. 32B is binarized using the first threshold value. In a case of increasing the mask edge width, the first threshold value is set around zero. In the case of increasing the mask edge width, a slant of the edge of the mask before being binarized may be given to only the vicinity of the first threshold value (that is, apart where a level of the mask is low). Whether or not there is a slant of a part where a level of the mask is high does not influence a binarization result. A mask M33 (the thick solid line) after being binarized of FIG. 31C and a mask M36 (the thick solid line) after being binarized of FIG. 32C, of which the edge width increases, have the same shape.

However, an operation amount is smaller in a case where the filtering operation is performed only on invalid pixels of the mask as in FIGS. 32A to 32C than in a case where the filtering operation is performed on all the pixels of the mask as in FIGS. 31A to 31C. The wider the valid pixel region of the mask, the more remarkable the difference therebetween. The filtering operation is performed only on the invalid pixels of the mask, and thereby a mask edge width is made to appropriately increase and an increase in an operation amount is suppressed so as to reduce a process time.

Figure 33A:
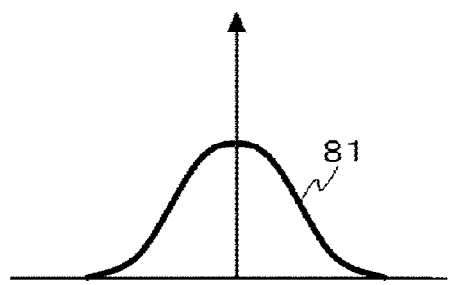
FIGS. 33A to 33C are diagrams illustrating a process of performing a filtering operation on all pixels so as to decrease a mask edge width.
Figure 33B:
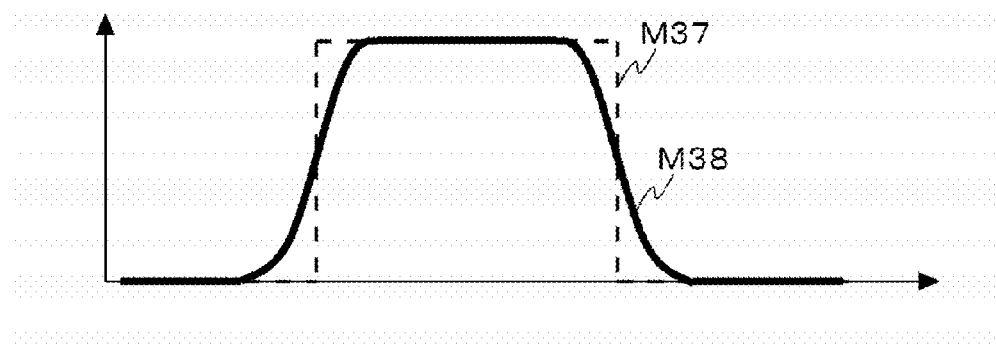
Figure 33C:
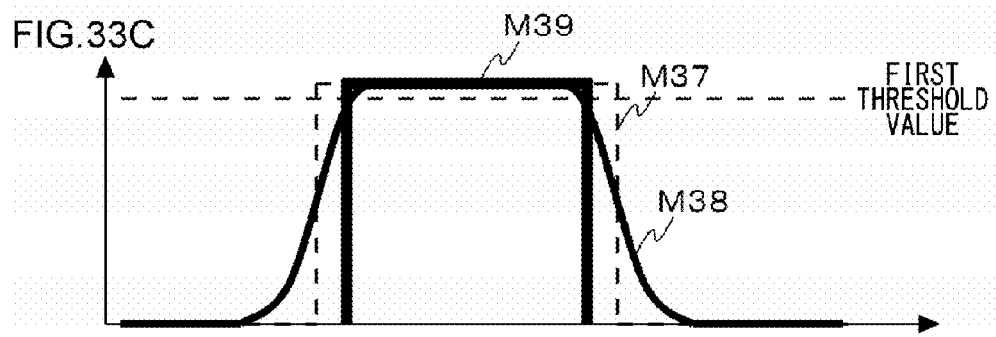
Figure 34A:
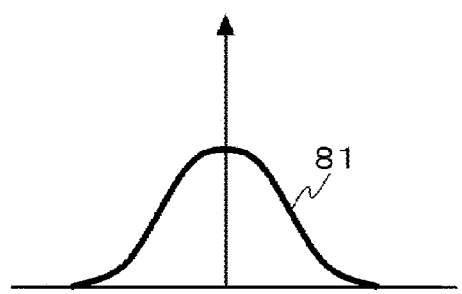
FIGS. 34A to 34C are diagrams illustrating a process of performing a filtering operation on only valid pixels of a mask so as to decrease a mask edge width.
Figure 34B:
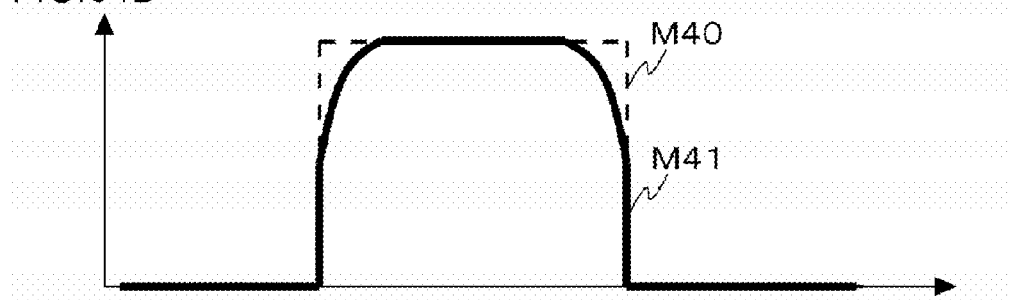
Figure 34C:
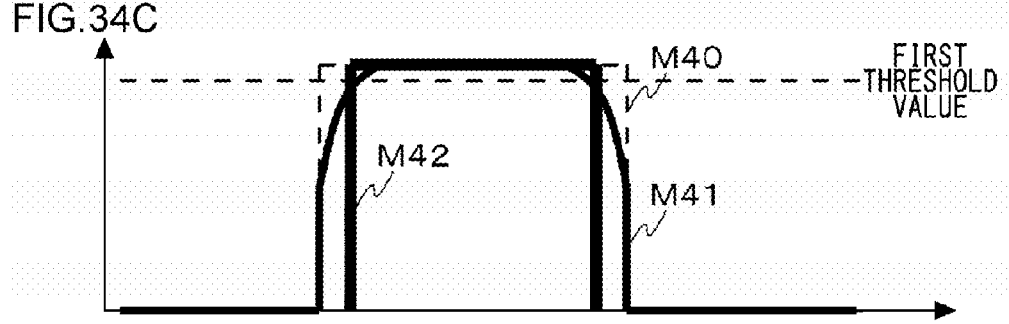

Next, a description will be made of a case of decreasing a mask edge width using the first low-pass filter 81. FIGS. 33A to 33C are diagrams illustrating a process of performing a filtering operation on all pixels so as to decrease a mask edge width. FIGS. 34A to 34C are diagrams illustrating a process of performing a filtering operation on only valid pixels of a mask so as to decrease a mask edge width. The first low-pass filter 81 illustrated in FIG. 33A has the same shape as the first low-pass filter 81 illustrated in FIG. 34A.

FIG. 33B illustrates a result in which a filtering operation is performed on all pixels of a mask M37 (the dotted line) which is a filtering target using the first low-pass filter 81 illustrated in FIG. 33A. FIG. 34B illustrates a result in which a filtering operation is performed on valid pixels of a mask M40 (the dotted line) which is a filtering target using the first low-pass filter 81 illustrated in FIG. 34A. As a result of the filtering operation, only the parts which have undergone the filtering operation are given a slant in a mask M38 (the solid line) and a mask M41 (the solid line), and the parts which have not undergone the filtering operation maintain a mask waveform before the filtering operation. In FIG. 33B, in the filtered mask M38 (the solid line), slants are given to the inside and the outside of the mask edge; however, in FIG. 34B, in the filtered mask M41 (the solid line), a slant is given to the inside of the mask edge, and a slant is not given to the outside thereof.

FIG. 33C illustrates a result in which the filtered mask M38 (the solid line) illustrated in FIG. 33B is binarized using the first threshold value. FIG. 34C illustrates a result in which the filtered mask M41 (the solid line) illustrated in FIG. 34B is binarized using the first threshold value. In a case of decreasing the mask edge width, the first threshold value is set around the maximum value. In the case of decreasing the mask edge width, a slant of the edge of the mask before being binarized may be given to only the vicinity of the first threshold value (that is, a part where a level of the mask is high). Whether or not there is a slant of a part where a level of the mask is low does not influence a binarization result. A mask M39 (the thick solid line) after being binarized of FIG. 33C and a mask M42 (the thick solid line) after being binarized of FIG. 34C, of which the edge width decreases, have the same shape.

However, an operation amount is smaller in a case where the filtering operation is performed only on valid pixels of the mask as in FIGS. 34A to 34C than in a case where the filtering operation is performed on all the pixels of the mask as in FIGS. 33A to 33C. The wider the invalid region of the mask, the more remarkable the difference therebetween. The filtering operation is performed only on the valid pixels of the mask, and thereby a mask edge width is made to appropriately decrease and an increase in an operation amount is suppressed so as to reduce a process time.

Next, a description will be made of a process performed by the second low-pass filter 83 for giving a slant to a mask edge in order to control a blending ratio of depth maps corresponding to a mask.

Figure 35A:
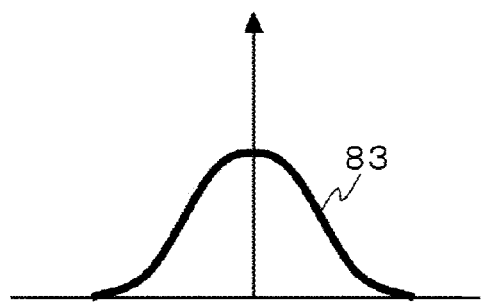
FIGS. 35A to 35C are diagrams illustrating a process of performing a filtering operation on all pixels so as to give a mask edge a slant.
Figure 35B:
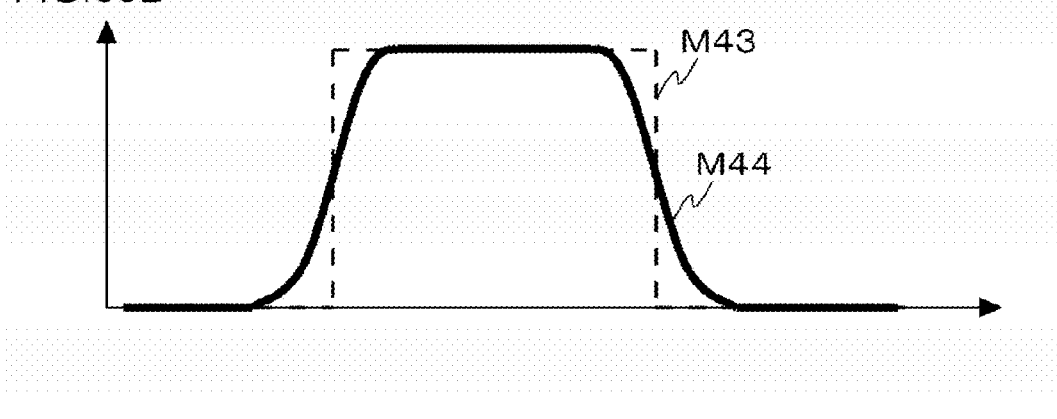
Figure 35C:
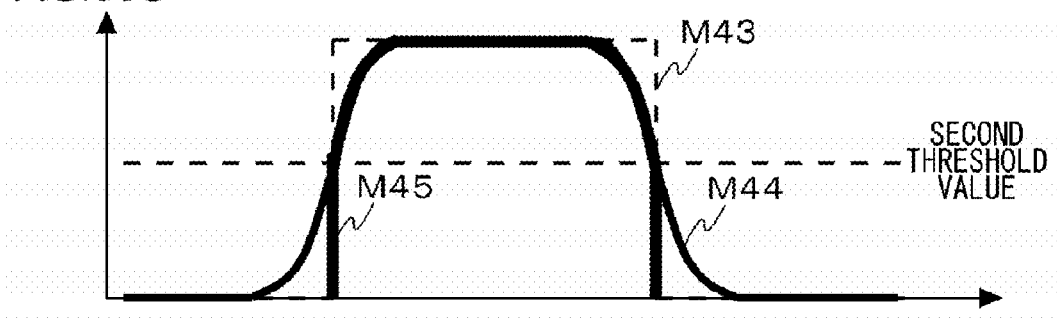
Figure 36A:
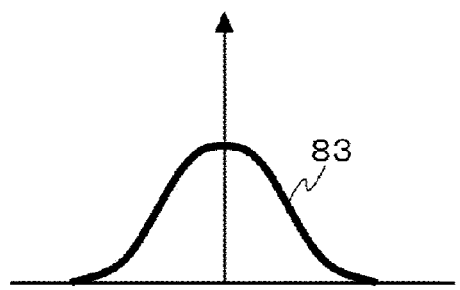
FIGS. 36A to 36C are diagrams illustrating a process of performing a filtering operation on only valid pixels of a mask so as to give a mask edge a slant.
Figure 36B:
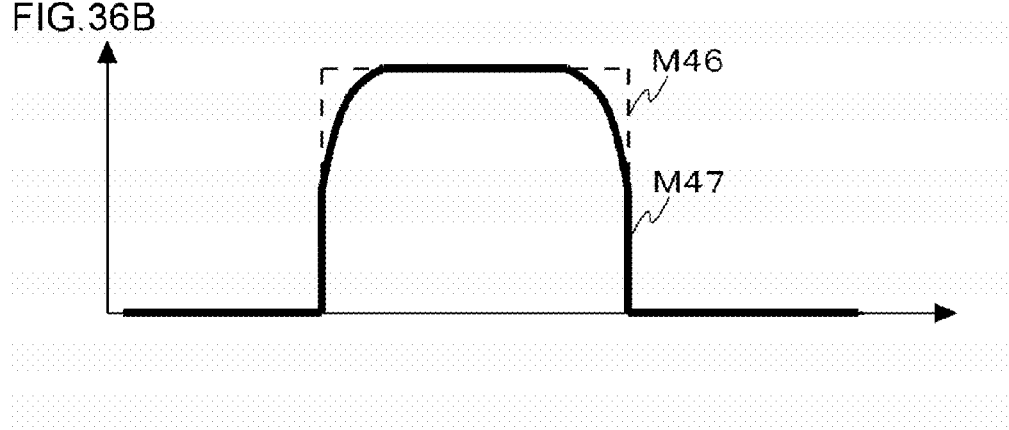
Figure 36C:
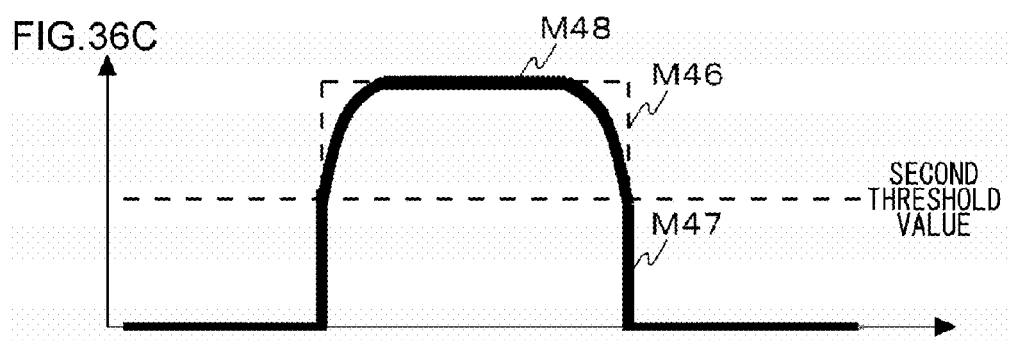

FIGS. 35A to 35C are diagrams illustrating a process of performing a filtering operation on all pixels so as to give a slant to a mask edge. FIGS. 36A to 36C are diagrams illustrating a process of performing a filtering operation on only valid pixels of a mask so as to give a slant to a mask edge. The second low-pass filter 83 illustrated in FIG. 35A has the same shape as the second low-pass filter 83 illustrated in FIG. 36A.

FIG. 35B illustrates a result in which a filtering operation is performed on all pixels of a mask M43 (the dotted line) which is a filtering target using the second low-pass filter 83 illustrated in FIG. 35A. FIG. 36B illustrates a result in which a filtering operation is performed on valid pixels of a mask M46 (the dotted line) which is a filtering target using the second low-pass filter 83 illustrated in FIG. 36A. As a result of the filtering operation, only the parts which have undergone the filtering operation are given a slant in a mask M44 (the solid line) and a mask M47 (the solid line), and the parts which have not undergone the filtering operation maintain a mask waveform before the filtering operation. In FIG. 35B, in the filtered mask M44 (the solid line), slants are given to the inside and the outside of the mask edge; however, in FIG. 36B, in the filtered mask M47 (the solid line), a slant is given to the inside of the mask edge, and a slant is not given to the outside thereof.

FIG. 35C illustrates a result in which a value of a level lower than the second threshold value is clipped to zero in the filtered mask M44 (the solid line) illustrated in FIG. 35B. FIG. 36C illustrates a result in which a value of a level lower than the second threshold value is clipped to zero in the filtered mask M47 (the solid line) illustrated in FIG. 36B. The second threshold value is set around an intermediate level of the mask level. The processes performed by the second low-pass filter 83 and the clipping section 84 are aimed at giving a slant to the high level side of the mask edge and setting a value of the low level side to zero. Therefore, a slant of the mask edge before being processed may be located only on an upper part (that is, a part where a level of the mask is high) of the second threshold value. Whether or not there is a slant of a lower part (that is, a part where a level of the mask is low) of the second threshold value does not influence a processing result. A mask M45 (the thick solid line) after being processed of FIG. 35C and a mask M48 (the thick solid line) after being processed of FIG. 36C, in which the edge is given a slant and a value equal to or smaller than the second threshold value is clipped to zero, have the same shape.

However, an operation amount is smaller in a case where the filtering operation is performed only on valid pixels of the mask as in FIGS. 36A to 36C than in a case where the filtering operation is performed on all the pixels of the mask as in FIGS. 35A to 35C. The wider the invalid region of the mask, the more remarkable the difference therebetween. The filtering operation is performed only on the valid pixels of the mask, and thereby a slant is given to the mask edge and an increase in an operation amount is suppressed so as to reduce a process time.

As described above, the process of changing a mask edge width and the process of giving a slant to a mask edge may be combined and used. Hereinafter, a description will be made of a difference between operation amounts in the method of Embodiment 1 and the method of Embodiment 3 in a case where the processes are combined and used.

First, a case where the process of increasing a mask edge width and the process of giving a slant to a mask edge are combined is considered. In the method of Embodiment 1, a filtering process is performed on all pixels of the mask. In contrast, in the method of Embodiment 3, a filtering process is performed only on invalid pixels in the process of increasing the mask edge width, and, a filtering process is performed only on valid pixels of the mask in the process of giving a slant to the mask edge. If operation amounts in the process of increasing the mask edge width and the process of giving a slant to the mask edge are the same, the method of Embodiment 3 can reduce a process amount to a half of the method of Embodiment 1 regardless of the area of valid pixels of the mask.

Next, a case where the process of decreasing a mask edge width and the process of giving a slant to a mask edge are combined is considered. In the method of Embodiment 1, a filtering process is performed on all pixels of the mask. In contrast, in the method of Embodiment 3, a filtering process is performed only on valid pixels of the mask in both the process of decreasing the mask edge width and the process of giving a slant to the mask edge. Therefore, as the number of valid pixels becomes smaller, the method of Embodiment 3 can considerably reduce a process amount as compared with the method of Embodiment 1.

As described above, according to Embodiment 3, in order to make an object boundary part of the combined depth map have continuity, and awkwardness of the object boundary part of an image (a 3D image) generated based on the combined depth map invisible, the following process is performed. A filtering process is performed on a mask which is used as a reference when a depth map is processed in order to move an edge position or give a slant to an edge. At this time, the filtering process on a valid region or an invalid region of the mask before the filtering process is performed is skipped, and thereby an effect equivalent to the process of Embodiment 1 can be obtained, and a process time can be reduced by reducing an operation amount.

Next, Embodiment 4 will be described. In Embodiment 1, the following processes are performed on a mask which is used as a reference when a depth map is processed. The area of a valid region of the mask is varied. A slant is given to an edge part of the mask (specifically, 0 or 1 is not made but an intermediate value such as 0.5 is made). Depth maps are combined through a-blending according to the slant (the intermediate value) given to the mask. A low-pass filter is applied to the combined depth map so as to suppress a rapid variation.

In Embodiment 1, a description has been made of a case where an object boundary part of the combined depth map has continuity through these processes, and awkwardness of the object boundary part of an image (a 3D image) generated based on the combined depth map is not visible.

In the method according to Embodiment 1, there is an occurrence of a case where a part which is not originally required to be corrected is corrected. There are cases where an image is awkwardly varied due to side effects of the correction. In addition, when an effect of the correction is weakened in order to prevent or reduce the side effects of the correction, awkwardness of an object boundary part may not be completely removed.

In Embodiment 4, means for achieving an effect that a mask correcting process is asymmetrical locally is studied in consideration of the particularity of the mask blurring process. Thereby, a correcting process can be performed exclusively only on an aimed part, and thus it is possible to prevent or reduce the above-described side effects. In other words, a mask edge part is processed asymmetrically, and a mask having an asymmetrical edge is processed. Thereby, while suppressing side effects of the correcting process, awkwardness of an object boundary part in a generated 3D image can be hardly visible.

In light of the particularity of the mask blurring process, first, the reason for an aimed effect being achieved by processing a mask asymmetrically will be described, and, next, detailed means for processing the mask asymmetrically will be described.

First, the reason for an aimed effect being achieved by processing a mask asymmetrically will be described. As described above, in the present specification, some pixels of an input image are shifted horizontally based on a depth value expressed by a depth map so as to generate a 3D image which has parallax for each object with respect to the input image. Generally, in a case where the input image is used as a left eye image, and a right eye image is generated by shifting pixels, the pixels are shifted to the left in order to give parallax in a protrusion direction. In this case, an omitted pixel region occurs on the right side of a shifted object due to the pixel shift. On the other hand, the shifted pixels cover background pixels on the left side of the shifted object. Omitted pixels do not occur on the left side of the object.

In other words, the pixel omission due to the pixel shift occurs on only one side of an object. A direction in which the pixel omission occurs depends on two facts, that is, whether or not an image to be generated is a right eye image or a left eye image and whether parallax in a protrusion direction or parallax in a depth direction is given to an object.

In the above-described example, if a mask edge is processed equally on both of left and right sides of an object, awkwardness of the boundary part is made to be invisible on the right side of the object. On the other hand, in a case where there is a certain texture in a background part corresponding to the left side of the object, pixel shift influenced by the processing of the mask edge also influences the background part. In this case, the background texture may possibly be distorted. For example, in a case where the background texture includes a white line of a road, the white line may possibly be distorted.

Therefore, the above-described processing of the mask edge is performed only on the right side of the object and is not performed on the left side thereof. Thereby, a background texture on the left side of the object can be made not to be distorted.

Next, detailed means for processing the mask asymmetrically will be described. As described in Embodiment 1, the following two filters are used to process the edge of the mask. One is a filter used for varying the area of a valid region of a mask by moving an edge position of the mask. The other is a filter for giving a slant to the mask edge in order to control a blending ratio of depth maps corresponding to the mask. The former corresponds to the first low-pass filter 81 of FIG. 16, and the latter corresponds to the second low-pass filter 83.

This filter generally has coefficients which are horizontally or vertically symmetrical. In Embodiment 4, a filter in which coefficients which are asymmetrical with respect to the center are set is intentionally used. Thereby, the mask edge can be processed horizontally asymmetrically, and thus it is possible to prevent or reduce side effects of the above-described correcting process.

Figure 37:
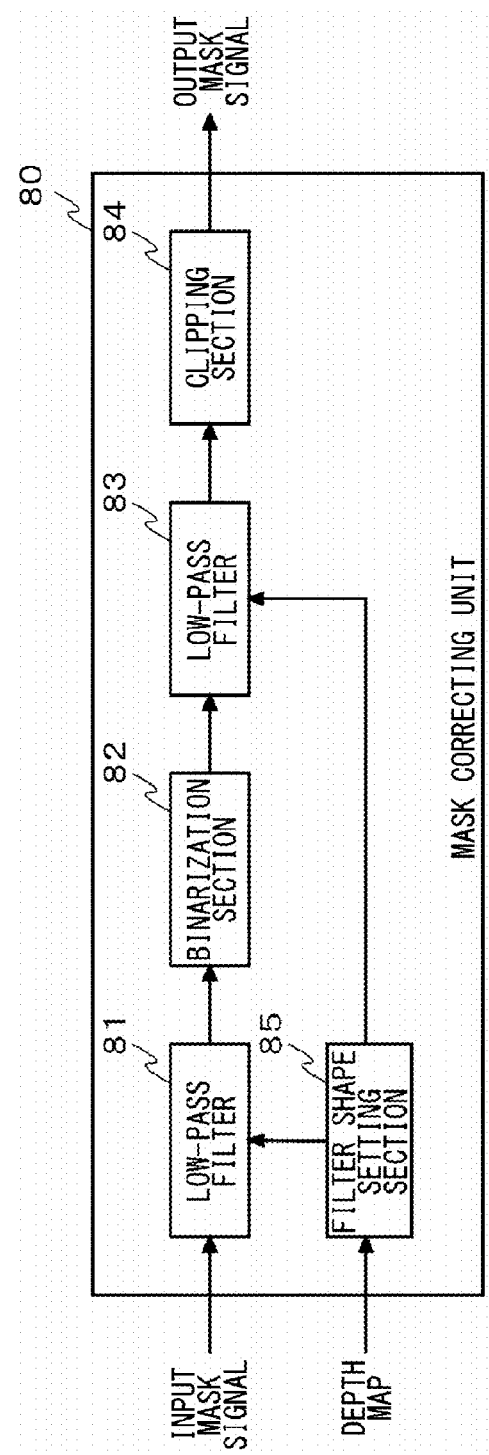
FIG. 37 is a diagram illustrating a configuration example of the mask correcting unit according to Embodiment 4 of the present invention.

FIG. 37 is a diagram illustrating a configuration example of the mask correcting unit 80 according to Embodiment 4. The mask correcting unit 80 according to Embodiment 4 has a configuration in which a filter shape setting section 85 is added to the mask correcting unit 80 of FIG. 16. Hereinafter, a description will be made of a difference from the mask correcting unit 80 of FIG. 16.

The mask correcting unit 80 according to Embodiment 4 performs a blurring process on an object boundary part of a mask using the second low-pass filter 83 which is at least horizontally asymmetrical. The filter shape setting section 85 sets a filter shape of the second low-pass filter 83. A user can set information for specifying a filter shape of the second low-pass filter 83 in the filter shape setting section 85 from the operation unit 60. The user sets the number of taps and/or a value of a coefficient of the second low-pass filter 83 to be horizontally asymmetrical, thereby setting the second low-pass filter 83 with a filter shape which is horizontally asymmetrical.

In addition, as described above, a two-dimensional low-pass filter may be used to perform the blurring process not only in the horizontal direction but also in the vertical direction. In this case, the user may set the second low-pass filter 83 with a filter shape which is horizontally and vertically asymmetrical. Further, as described above, if an elliptical two-dimensional low-pass filter is used, a natural blurring process can also be performed in a slant direction.

In this way, the user can set the second low-pass filter 83 which has separate coefficients in the horizontal direction, in the vertical direction, and in the slant direction, and has a coefficient which is asymmetrical with respect to the center. In other words, it is possible to set the second low-pass filter 83 with a shape which is asymmetrical horizontally, vertically, and diagonally in all directions. In this way, the user can make the effect of the blurring process randomly act on any of vertical, horizontal and diagonal parts of a target object.

Hereinafter, an effect of a case where the second low-pass filter 83 is horizontally asymmetrical will be examined. For better understanding of description of the examination, a one-dimensional low-pass filter which performs a blurring process in the horizontal direction is assumed.

Figure 38A:
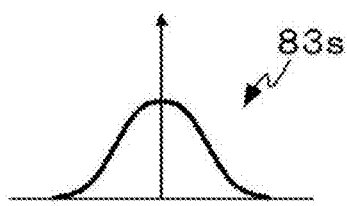
FIGS. 38A to 38C are diagrams illustrating a processing process of a mask edge using a second low-pass filter which is horizontally symmetrical.
Figure 38B:
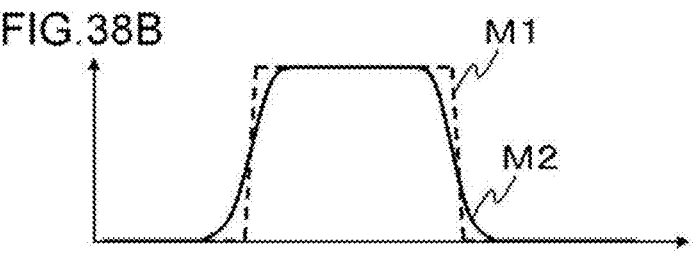
Figure 38C:
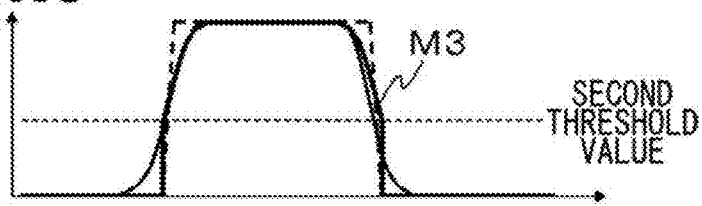
Figure 39A:
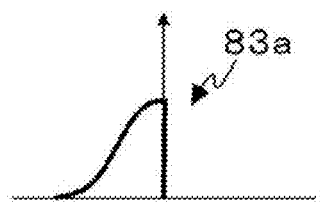
FIGS. 39A to 39C are diagrams illustrating a processing process of a mask edge using a second low-pass filter which is horizontally asymmetrical.
Figure 39B:
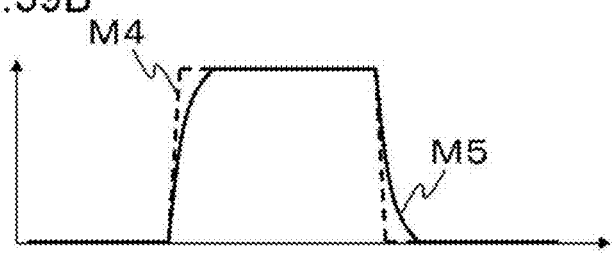
Figure 39C:
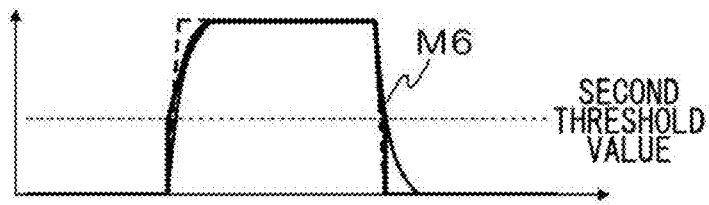

FIGS. 38A to 38C are diagrams illustrating a processing process of a mask edge using a second low-pass filter 83s which is horizontally symmetrical. FIGS. 39A to 39C are diagrams illustrating a processing process of a mask edge using a second low-pass filter 83a which is horizontally asymmetrical. FIG. 38A illustrates an example of the second low-pass filter 83s which is horizontally symmetrical. FIG. 39A illustrates an example of the second low-pass filter 83a which is horizontally asymmetrical.

FIG. 38B illustrates a process of filtering a mask M1 (the dotted line) using the second low-pass filter 83s of FIG. 38A which is horizontally symmetrical. A filtered mask M2 (the solid line) has left and right edges which are equal and smooth. FIG. 39B illustrates a process of filtering a mask M4 (the dotted line) using the second low-pass filter 83a of FIG. 39A which is horizontally symmetrical. A filtered mask M5 (the solid line) has left and right edge shapes which are different. A high level region of the left edge is blunt gently. A low level region of the right edge gently extends outward.

As illustrated in FIG. 17, the mask filtered by the second low-pass filter 83 is clipped using the second threshold value. In the clipping process, a mask value of a level lower than the second threshold value is set to zero. The second threshold value is set around an intermediate level of the mask level.

FIG. 38C illustrates a process of clipping the filtered mask (the thin solid line) of FIG. 38B with the second threshold value. In a mask M3 (the thick solid line) after being clipped, low level regions of the left and right edges are vertical. FIG. 39C illustrates a process of clipping the filtered mask (the thin solid line) of FIG. 39B with the second threshold value. In a mask M6 after being clipped, low level regions of the left and right edges are also vertical.

Upon comparison of the mask M3 with the mask M6, the former has the same slant in the left and right edges. The latter has different slants in the left and right edges. As illustrated in FIG. 39A, in a case of using the second low-pass filter 83a which has a coefficient only in the left side with respect to the center, a slant is given to the left edge, but a slant is not given to the right edge for the most part. The right edge maintains an edge in a steep state, which is approximately the same as the state before being processed.

As illustrated in FIG. 39B, a gentle slant is given to the low level region in the right edge of the mask M5 filtered by the asymmetrical second low-pass filter 83a. Then, as illustrated in FIG. 39C, the mask M5 is compared with the second threshold value, and a mask value of a level lower than the second threshold value is clipped to zero. Thereby, the slant of the low level region in the right edge of the mask M6 after being clipped is removed.

If the clipping process is not performed, even though an edge shape of the mask can be made to be horizontally asymmetrical, the slant of the low level region of the mask level remains. The aim of the mask edge processing process according to Embodiment 4 cannot be achieved. In other words, the effect cannot be achieved in which horizontally asymmetrical blending of layer depths, further, a range influenced by pixel shift when 3D images are generated is limited, and thereby the mask edge processing process does not influence a background part where there is a texture.

In contrast, the above-described clipping process is added thereto, and thereby a processing is possible in which a slant is given to only one edge of a mask and a slant is not given to the other edge. Therefore, the clipping process according to Embodiment 4 achieves an advantageous effect which cannot be easily derived from a mere processing process in which a mask edge shape is set to be asymmetrical.

As described above, the user can set any of a filter shape of the second low-pass filter 83. Therefore, a blurring process which has a bias not in all directions of an object but in any directions can be performed. For example, the bias can be adjusted depending on circumstances of a texture around the object. In the following description, a process of setting a filter shape of the second low-pass filter 83 not manually but automatically will be described. Thereby, it is possible to reduce a work load on the user.

The description will be continued with reference to FIG. 37 again. The filter shape setting section 85 sets a filter shape of the second low-pass filter 83 according to whether an image to be generated is a right eye image or a left eye image, and an anteroposterior relationship between an object and the periphery thereof obtained from a comparison result of a depth value of inside of a boundary and a depth value of outside of the boundary in an object boundary part of a mask.

In a case where an image to be generated is a left eye image, and an object is located in front of the periphery (that is, in the protrusion direction), the 3D image generation unit 30 pixel-shifts an object to the right. In a case where an image to be generated is a left eye image, and an object is located further inward than the periphery (that is, in the depth direction), the 3D image generation unit 30 pixel-shifts an object to the left. In a case where an image to be generated is a right eye image, and an object is located in front of the periphery (that is, in the protrusion direction), the 3D image generation unit 30 pixel-shifts an object to the left. In a case where an image to be generated is a right eye image, and an object is located further inward than the periphery (that is, in the depth direction), the 3D image generation unit 30 pixel-shifts an object to the right.

In a case where the object is pixel-shifted to the right, the filter shape setting section 85 sets a filter shape in which the left edge of the second low-pass filter 83 is gentler than the right edge. The filter shape is set in which a slant is not given to the right edge, or only a very small slant is given thereto. In a case where the object is pixel-shifted to the left, the filter shape setting section 85 sets a filter shape in which the right edge of the second low-pass filter 83 is gentler than the left edge.

Hereinafter, a description thereof will be made in detail. Of a right eye image and a left eye image forming 3D images, the image editing system 500 in the present specification assigns an original input image to one and an image generated through pixel shift to the other. This assignment is determined by a user's settings. The determined assignment is set in the filter shape setting section 85.

Next, it is determined whether or not an object indicated by a mask is present in a protrusion direction or in a depth direction with respect to the periphery. In a case where the object is present in the protrusion direction, it is necessary to lengthen a distance between the object in a right eye image and the object in a left eye image. Conversely, in a case where the object is present in the depth direction, it is necessary to shorten the distance. A depth map is used to determine whether an object is present in the protrusion direction or in the depth direction with respect to the periphery.

The filter shape setting section 85 analyzes a depth map so as to obtain a relative difference between a depth value of a region of an object indicated by a mask and a depth value of the periphery thereof. For example, a difference between an average value of depth values in the region of the object and an average value of depth values in a range set in the periphery is obtained.

In the present specification, the closer to white, the higher the depth value, and, the closer to black, the lower the depth value. Therefore, if a depth value of the region of the object is larger than a depth value of the periphery, it can be determined that the object is closer to an observer than the periphery. Conversely, if a depth value of the region of the object is smaller than a depth value of the periphery, it can be determined that the object is more distant from an observer than the periphery.

A case where a depth value of a region of an object indicated by a mask is larger than a depth value of the periphery, that is, where it is determined that the object is located in the protrusion direction, is considered. In a case where an image generated through pixel shift is assigned to a right eye image in the premises thereof, it can be determined that a direction of the pixel shift is the left. In this case, an omitted pixel region occurs on the right side of the object due to the pixel shift. Therefore, a correction process is preferable in which the right side of the object is processed so as to be wider and be further given a slant, and the left side of the object is not processed. The filter shape setting section 85 sets the second low-pass filter 83 with a filter shape in which the right edge is gentler in order to realize such a correcting process.

In this way, the filter shape setting section 85 determines a direction in which a filter shape of the second low-pass filter 83 is biased based on two parameters including whether an image generated through pixel shift is a right eye image or a left eye image, and a relative difference between depth values of a region of an object and the periphery.

Figure 40:
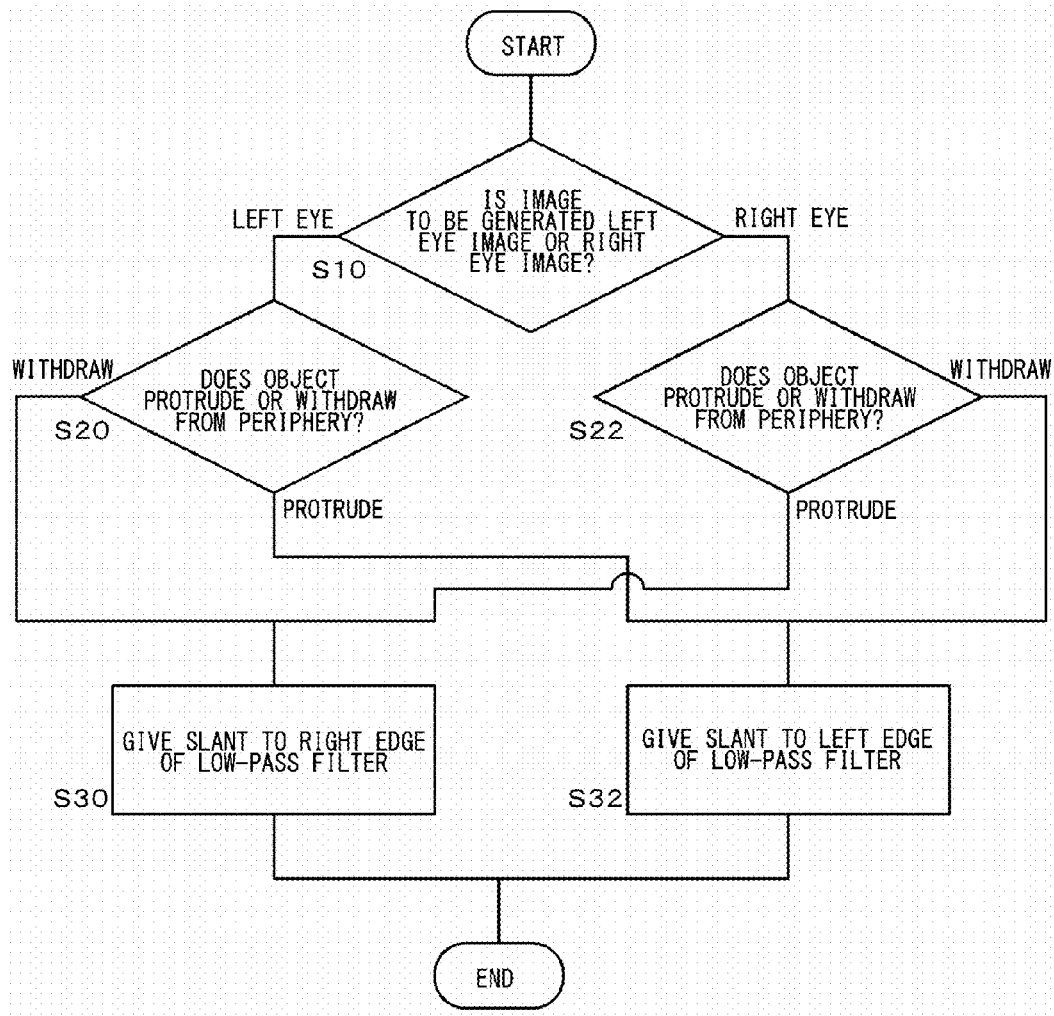
FIG. 40 is a flowchart illustrating a process of determining a filter shape with a filter shape setting section according to Embodiment 4 of the present invention.

FIG. 40 is a flowchart illustrating a process of determining a filter shape with the filter shape setting section 85 according to Embodiment 4. First, the filter shape setting section 85 determines whether a generated image is a right eye image or a left eye image (S10). Next, it is determined whether the object protrudes or withdraws from the periphery (S20 or S22).

If the generated image is a left eye image (the left eye in S10) and the object withdraws from the periphery (withdraw in S20), the filter shape setting section 85 determines a direction of pixel shift as the left and sets a filter shape of the second low-pass filter 83 to a filter shape in which a slant is given to the right edge (S31). If the generated image is a left eye image (the left eye in S10) and the object protrudes from the periphery (protrude in S20), the filter shape setting section 85 determines a direction of pixel shift as the right and sets a filter shape of the second low-pass filter 83 to a filter shape in which a slant is given to the left edge (S32).

If the generated image is a right eye image (the right eye in S10) and the object protrudes from the periphery (protrude in S22), the filter shape setting section 85 determines a direction of pixel shift as the left and sets a filter shape of the second low-pass filter 83 to a filter shape in which a slant is given to the right edge (S31). If the generated image is a right eye image (the right eye in S10) and the object withdraws from the periphery (withdraw in S22), the filter shape setting section 85 determines a direction of pixel shift as the right and sets a filter shape of the second low-pass filter 83 to a filter shape in which a slant is given to the left edge (S32).

In addition, the filter shape setting section 85 may determine an extent of a slant in the edge on a side (that is, a side to which a slant is to be given) which is to be gentler, according to a difference between a depth value of inside of an object boundary and a depth value of outside thereof. A large difference indicates that a step-difference of the object boundary is large and a pixel shift amount increases. The filter shape setting section 85 increases an extent of a slant as the difference gets larger. That is to say, the larger the difference is, the gentler the slant to be given to an edge is set to be.

The example in which the second low-pass filter 83 is horizontally asymmetrical has been described hitherto. In Embodiment 4, not only the second low-pass filter 83 but also the first low-pass filter 81 may be horizontally asymmetrical.

Figure 41A:
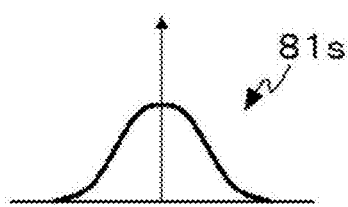
FIGS. 41A to 41C are diagrams illustrating a processing process of a mask edge using a first low-pass filter which is horizontally symmetrical.
Figure 41B:
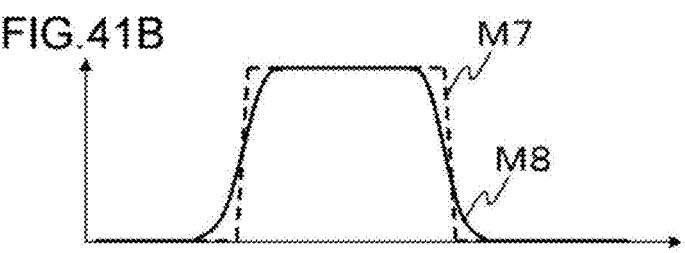
Figure 41C:
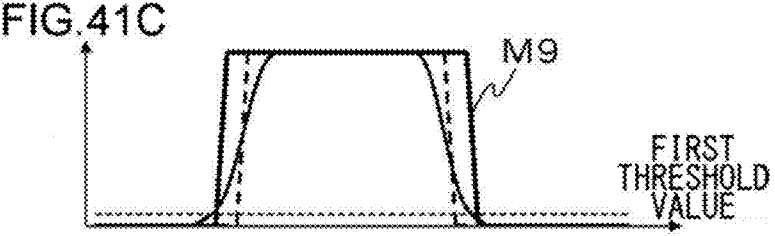
Figure 42A:
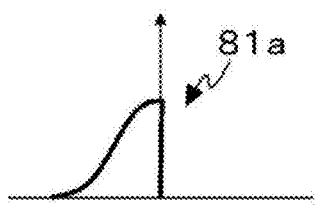
FIGS. 42A to 42C are diagrams illustrating a processing process of a mask edge using a first low-pass filter which is horizontally asymmetrical.
Figure 42B:
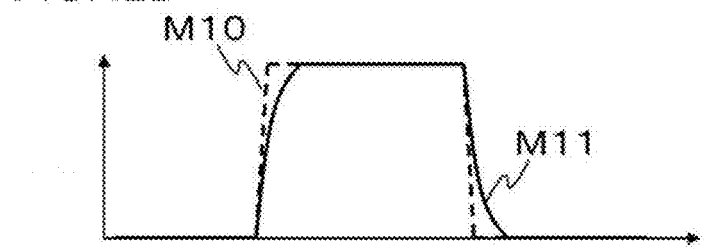
Figure 42C:
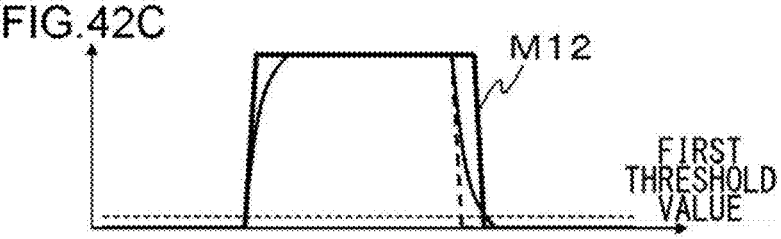

FIGS. 41A to 41C are diagrams illustrating a processing process of a mask edge using a first low-pass filter 81*s* which is horizontally symmetrical. FIGS. 42A to 42C are diagrams illustrating a processing process of a mask edge using a first low-pass filter 81*a* which is horizontally asymmetrical. FIG. 41A illustrates an example of the first low-pass filter 81*s* which is horizontally symmetrical. FIG. 42A illustrates an example of the first low-pass filter 81*a* which is horizontally asymmetrical.

FIG. 41B illustrates a process of filtering a mask M7 (the dotted line) using the first low-pass filter 81*s* of FIG. 41A which is horizontally symmetrical. A filtered mask M8 (the solid line) has left and right edges which are the same and gentle. FIG. 42B illustrates a process of filtering a mask M10 (the dotted line) using the first low-pass filter 81*a* of FIG. 42A which is horizontally symmetrical. A filtered mask M11 (the solid line) has left and right edge shapes which are different. A high level region of the left edge is blunt gently. A low level region of the right edge gently extends outward.

FIG. 41C illustrates a processing process of increasing a mask edge width by binarizing the filtered mask (the thin solid line) of FIG. 41B with the first threshold value (refer to FIG. 17). In a case of increasing the edge width, the first threshold value is set around zero. FIG. 42C illustrates a processing process of increasing a mask edge width by binarizing the filtered mask (the thin solid line) of FIG. 42B with the first threshold value.

As illustrated in FIG. 41C, a mask M9 after being processed has the left and right edges which equally extend. On the other hand, as illustrated in FIG. 42C, the mask M12 after being processed has the left and right edges of which a movement amount is different. In a case of using the first low-pass filter 81a which has a coefficient on only the left side with respect to the center, as illustrated in FIG. 42C, the right edge position is moved to the right, but the left edge position remains in an original position. As above, the left and right sides of the mask can be widened unequally.

In a case of giving a slant to the mask edge, an object boundary part is widened. In this case, if the edge position of the mask is left as it is, the object boundary part goes toward inside of the object. Therefore, in a case of giving a slant to the edge, typically, the edge position is moved outward. The larger the extent of a slant is, the further outward the edge position is moved. As above, an extent of the slant and a movement amount of the edge position have a proportional relationship.

As illustrated in FIGS. 39A to 39C and FIGS. 42A to 42C, in the low-pass filter with a filter shape which has a coefficient on the left side, the left edge slants, and the right edge position is moved outward. Therefore, the first low-pass filter 81 and the second low-pass filter 83 are required to be set to filter shapes which are horizontally opposite to each other. In a case where the left side of the object is desired to be blurred, the second low-pass filter 83 which has a coefficient on the left side is set, and the first low-pass filter 81 which has a coefficient on the right side is set. Conversely, in a case where the right side of the object is desired to be blurred, the second low-pass filter 83 which has a coefficient on the right side is set, and the first low-pass filter 81 which has a coefficient on the left side is set.

The example illustrated in FIGS. 42A to 42C is an example of the case where the edge position of the mask is moved outward (that, the width of the mask increases) using the first low-pass filter 81. In a case of increasing the width of the mask, there is a use of the first low-pass filter 81 with a filter shape which has a coefficient on an opposite side to an edge side which is moved outward. Conversely, in a case of moving the edge position of the mask inward (that is, the width of the mask decreases), there is a use of the first low-pass filter 81 with a filter shape which has a coefficient on the same side as an edge side which is moved inward.

FIG. 42A illustrates the first low-pass filter 81a with a filter shape which has a coefficient on only the left side. FIG. 42B illustrates the mask M11 which has been filtered by the first low-pass filter 81a. On the left side of the mask M11, a slant is given to inside, and, on the right side thereof, a slant is given to outside.

In a case of increasing the width of the original mask M10, a level of the first threshold value is set to be low. If the filtered mask M11 is binarized with the first threshold value, the right edge in which the slant is given to the outside of the original mask M10 is moved outward, and thus the width of the original mask M10 grows to the right (refer to FIG. 42C). The left side does not vary. Conversely, in a case of decreasing the width of the original mask M10, a level of the first threshold value is set to be high. If the filtered mask M11 is binarized with the first threshold value, the left edge in which the slant is given to the inside of the original mask M10 is moved inward, and thus the left side of the original mask M10 is reduced. The right side does not vary. In this way, in a case of increasing the width of the mask, an opposite side to a side having a coefficient of the first low-pass filter 81 is widened, and, in a case of decreasing the width of the mask, the same side as a side having a coefficient of the first low-pass filter 81 is narrowed.

In the description hitherto, the description has been made of the method in which the entire mask is processed in the same way using a single filter defined by a unique coefficient when processing an edge. This is not necessarily limited to the process of using a single filter in order to achieve an effect of performing the processing of a mask edge described hitherto in an asymmetrical manner. A filtering process may be performed individually for each region of a mask edge by using a plurality of filters with different filter shapes. In other words, a filter with a wide shape is used for a region on which a processing of a mask is desired to be performed widely. Conversely, a filter with a narrow shape is used for a region on which an extent of a processing of a mask is desired to be reduced, or no filtering process is performed. As above, a plurality of types of low-pass filters may be changed and used for each region of a mask edge.

As described above, according to Embodiment 4, the processing of a mask edge can be performed asymmetrically horizontally, vertically, and diagonally in all directions. An object boundary part is corrected using such a mask, and thereby only a distorted part can be exclusively corrected without influencing a normal background texture. Therefore, it is possible to generate high definition 3D images.

As above, the present invention has been described based on the embodiments. The embodiments are only an example, and it can be understood by a person skilled in the art that various modified examples are possible in combinations of the constituent elements or the process procedures, and the modified examples are also included in the scope of the present invention.

In the image editing system 500 according to Embodiment 2, a processing by the depth map processing unit 20 may be skipped, and a depth map generated by the depth map generation unit 10 may be used as it is. In addition, depth maps which are not divided for each object region and are processed in the same way may be used. Further, depth maps which are generated by a user's work from the beginning may be used.

In Embodiment 3, a description has been made of an example in which the second level determining section 87 skips a filtering process by the second low-pass filter 83 on an invalid region of a mask signal after an edge position is adjusted. This process is a process for giving a slant to an inner part of a mask edge. In a case of giving a slant to an outer part of the mask edge, the second level determining section 87 skips a filtering process by the second low-pass filter 83 on a valid region of the mask signal.

In Embodiment 4, a description has been made of an example in which a filter shape of the first low-pass filter 81 is set to be horizontally asymmetrical in order to move an edge position of a mask horizontally asymmetrically. In relation to this, even if the first threshold value is set to different values in the right edge part and the left edge part while using the first low-pass filter 81 which is horizontally symmetrical, an edge position of the mask can be moved horizontally asymmetrically. In a case of moving the edge position of the mask outward, the first threshold value is set to be low, and, in a case of moving the edge position inward, the first threshold value is set to be high.

What is claimed is:

1. An image process device comprising:
a mask correcting unit configured to correct an externally set mask pattern;
a depth map processing unit configured to process a depth map of an input image for each of a plurality of regions designated by a plurality of mask patterns corrected by the mask correcting unit; and
an image generation unit configured to generate an image of a different viewpoint on the basis of the input image and depth maps processed by the depth map processing unit, wherein
the mask correcting unit includes
a first low-pass filter configured to apply a filter to a mask signal;
a binarization section configured to binarize the mask signal output from the first low-pass filter by using a first threshold value for moving a position of an edge of the mask signal; and
a second low-pass filter configured to give a slant to the edge of the mask signal in which the position of the edge is moved through the binarization by the binarization section, and a blurring process is performed on an object boundary part of the mask pattern.

2. The image process device according to claim 1, wherein the mask correcting unit further includes:
a clipping section configured to clip a mask signal equal to or smaller than a second threshold value to zero, the mask signal being output by the second low-pass filter.

3. The image process device according to claim 1, wherein the depth map processing unit alpha-blends depth maps of the plurality of regions, generated based on mask patterns corrected by the mask correcting unit.

4. The image process device according to claim 1, wherein the mask correcting unit further includes:
a level determining section that determines a level of the mask signal, and
the level determining section limits a target region for performing a filtering process on the mask signal, of at least one of the first low-pass filter and the second low-pass filter, according to a level determination result.

5. The image process device according to claim 4, wherein the level determining section skips a filtering process by the first low-pass filter on a valid region of the mask signal when the valid region of the mask signal increases, and skips the filtering process by the first low-pass filter on an invalid region of the mask signal when the valid region of the mask signal decreases.

6. The image process device according to claim 4, wherein the level determining section skips a filtering process by the second low-pass filter on an invalid region of the mask signal in which the position of the edge is moved through the binarization by the binarization section.

7. An image process method comprising:
performing a blurring process on an object boundary part of an externally set mask pattern;
processing a depth map of an input image for each of a plurality of regions designated by a plurality of mask patterns in which the blurring process has been performed on the object boundary part; and
generating an image of a different viewpoint on the basis of the input image and processed depth maps, wherein
the performing of the blurring process includes
applying a low-pass filter to a mask signal;
binarizing the mask signal to which the low-pass filter has been applied by using a first threshold value for moving a position of an edge of the mask signal; and
applying a low-pass filter in order to give a slant to the edge of the mask signal in which the position of the edge is moved through the binarization.

8. An image process computer program stored on a non-transitory computer readable medium causing a computer to execute the processes of: performing a blurring process on an object boundary part of an externally set mask pattern; processing a depth map of an input image for each of a plurality of regions designated by a plurality of mask patterns in which the blurring process has been performed on the object boundary part; and generating an image of a different viewpoint on the basis of the input image and processed depth maps, wherein the process of performing the blurring process includes the processes of applying a low-pass filter to a mask signal; binarizing the mask signal to which the low-pass filter has been applied by using a first threshold value for moving a position of an edge of the mask signal; and applying a low-pass filter in order to give a slant to the edge of the mask signal in which the position of the edge is moved through the binarization.

* * * * *